(12) United States Patent
Dong et al.

(10) Patent No.: US 10,924,315 B2
(45) Date of Patent: Feb. 16, 2021

(54) DATA TRANSMISSION METHOD AND COMMUNICATIONS DEVICE

(71) Applicant: Huawei Technologies Co., Ltd., Guangdong (CN)

(72) Inventors: Pengpeng Dong, Shanghai (CN); Mengying Ding, Shanghai (CN); Yuanzhou Hu, Shanghai (CN); Zongjie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/371,801

(22) Filed: Apr. 1, 2019

(65) Prior Publication Data

US 2019/0273643 A1 Sep. 5, 2019

Related U.S. Application Data

(63) Continuation of application No. PCT/CN2017/103012, filed on Sep. 22, 2017.

(30) Foreign Application Priority Data

Sep. 30, 2016 (CN) .......................... 2016 1 0877323

(51) Int. Cl.
*H04L 27/26* (2006.01)
*H04L 25/02* (2006.01)

(52) U.S. Cl.
CPC ........ *H04L 27/265* (2013.01); *H04L 25/0202* (2013.01); *H04L 27/26* (2013.01);
(Continued)

(58) Field of Classification Search
CPC ... H04L 27/265; H04L 27/2605; H04L 27/26; H04L 27/2647; H04L 27/2636;
(Continued)

(56) References Cited

U.S. PATENT DOCUMENTS 8,149,685 B2 4/2012 Yucek et al.
9,313,063 B1 4/2016 Jia et al.
(Continued)

OTHER PUBLICATIONS

Qualcomm Incorporated, "Single Carrier Waveform Evaluation," 3GPP TSG-RAN WG1 #84b R1-164684, May 23-27, 2016, Nanjing, China, 9 pages.
(Continued)

*Primary Examiner* — Kabir A Timory
(74) *Attorney, Agent, or Firm* — Slater Matsil, LLP

(57) ABSTRACT

Embodiments of the present disclosure relate to a data transmission method and a communications device. The method includes: performing an interpolation operation on a first signal sequence to obtain a second signal sequence, where a length of the second signal sequence is greater than a length of the first signal sequence; mapping the second signal sequence onto a subcarrier to obtain a second signal sequence that is on the subcarrier; performing an inverse fast Fourier transform (IFFT) on the second signal sequence that is on the subcarrier, to obtain a time-domain signal, and transmitting the time-domain signal. According to the embodiments of the present disclosure, a delay deviation can be better resisted.

19 Claims, 21 Drawing Sheets

(52) U.S. Cl.
CPC ...... *H04L 27/2605* (2013.01); *H04L 27/2636* (2013.01); *H04L 27/2647* (2013.01); *H04L 27/2669* (2013.01); *H04L 27/2675* (2013.01)

(58) Field of Classification Search
CPC ............. H04L 25/0202; H04L 27/2669; H04L 27/2675; H04L 27/2678
See application file for complete search history.

(56) References Cited

U.S. PATENT DOCUMENTS

2010/0246711 A1* 9/2010 Kishigami .......... H04L 27/2649
375/295
2010/0329229 A1* 12/2010 Lipka ................. H04L 27/2636
370/344

OTHER PUBLICATIONS

Qualcomm Incorporated, "Waveform Candidates," 3GPP TSG-RAN WG1 #84b R1-162199, Apr. 11-15, 2016, Busan, Korea, 26 pages.
Berardinelli, Gilberto et al., "A novel channel estimator for Zero-Tail DFT-spread-OFDM", 2016 International Symposium on Wireless Communication Systems (ISWCS), 5 pages.
Hofbauer, Christian et al., "Coded OFDM by unique word prefix", 2010 IEEE International Conference on Communication Systems, Nov. 17-19, 2010, 5 pages.
Steendam, Heidi et al, "Theoretical Performance Evaluation and Optimization of UW-OFDM", IEEE Transactions on Communications, vol. 64, No. 4, Apr. 2016, 12 pages.
Texas Instruments, "Uplink Reference Signals in Support of High-Speed UEs", 3GPP TSG RAN WG1 #51 R1-074678, Jeju, Korea, Nov. 5-9, 2007, 6 pages.

* cited by examiner

FIG. 4

DATA TRANSMISSION METHOD AND COMMUNICATIONS DEVICE

CROSS-REFERENCE TO RELATED APPLICATIONS

This application is a continuation of International Application No. PCT/CN2017/103012, filed on Sep. 22, 2017, which claims priority to Chinese Patent Application No. 201610877323.8, filed on Sep. 30, 2016. The disclosures of the aforementioned applications are hereby incorporated by reference in their entireties.

TECHNICAL FIELD

The present application relates to the field of communications technologies, and in particular, to a data transmission method and a communications device.

BACKGROUND

In an LTE system and currently discussed 5G standards, a waveform based on orthogonal frequency division multiplexing (OFDM) is acknowledged as a baseline waveform and has advantages such as having a low-complexity frequency-domain balancing algorithm and using a multiple input multiple output (MIMO) technology to perform flexible multilayer data spatial multiplexing. These advantages are attributed to a cyclic prefix (CP) inserted between OFDM symbols, and ensure a desirable automatic circulation feature of each symbol, so as to ensure that no intersymbol interference (ISI) is caused provided that the CP is capable of covering a maximum channel delay spread.

However, in an actual network, a distance between a user and a base station keeps changing, and in a special case such as super-distance coverage, an existing LTE protocol further defines a waveform with an extended CP. In addition, downlink coordinated multipoint (DL CoMP) transmission is also a currently discussed hotspot in 5G. Different transmit points belong to different base stations, and clock sources used by different base stations may be different; therefore, it is very difficult to ensure timing synchronization between the transmit points. Therefore, an additional delay deviation between transmit points is caused based on a delay spread of a wireless channel. Consequently, a quasi co-location (QCL) requirement is no longer satisfied between different transmit points, and this poses a greater challenge to a CP length.

To resist a channel delay spread, a CP manner is used in all existing LTE protocols. According to an existing extended CP solution, an extended CP is a cell-level configuration. Therefore, a throughput of all users in an entire cell is affected, and is intuitively and directly reduced by 13%. The extended CP needs to be configured for each CoMP transmit end. Consequently, a signal throughput of each transmit end is directly reduced by 13%. In the existing protocols, there is only one long CP format, that is, the extended CP. As a result, an ever-changing channel delay deviation cannot be adapted well, too many resources are wasted, or ISI is caused.

To sum up, a CP definition in the existing protocols cannot flexibly satisfy requirements of various scenarios in 5G; and therefore an OFDM waveform solution that can be adaptive to various delay deviation scenarios is required.

SUMMARY

Embodiments of the present disclosure provide a data transmission method and a communications device, to resolve a prior-art problem that a CP definition cannot flexibly satisfy requirements of various scenarios in 5G.

According to a first aspect, an embodiment of the present disclosure provides a data transmission method. The method includes: performing an interpolation operation on a first signal sequence to obtain a second signal sequence; mapping the second signal sequence onto a subcarrier to obtain a second signal sequence that is on the subcarrier; performing an inverse fast Fourier transform IFFT on the second signal sequence that is on the subcarrier, to obtain a time-domain signal, and transmitting the time-domain signal.

According to this embodiment of the present disclosure, an adaptive zero tail (ZT) effect of an OFDM symbol is achieved in time domain by performing a frequency-domain interpolation operation, so that a transmitted time-domain signal can better resist a delay deviation.

In an optional implementation, before the performing an interpolation operation on a first signal sequence, the method further includes: determining an interpolation parameter; and the performing an interpolation operation on a first signal sequence to obtain a second signal sequence includes: performing the interpolation operation on the first signal sequence based on the interpolation parameter, to obtain the second signal sequence, where a length of the second signal sequence is greater than a length of the first signal sequence.

According to this embodiment of the present disclosure, a length of a ZT may be adjusted and controlled by using the interpolation parameter, and with reference to different interpolation parameters, different channel delay variations can be flexibly coped with.

In an optional implementation, before the determining an interpolation parameter, the method further includes: obtaining a maximum delay deviation of a signal of a terminal device, where the signal of the terminal device is a wireless signal sent to the terminal device or a wireless signal sent by the terminal device, and the maximum delay deviation is a difference between an earliest time and a latest time at which the signal of the terminal device arrives at a receive end through a wireless channel after the signal of the terminal device is sent from a transmit end; and the determining an interpolation parameter includes: determining the interpolation parameter based on the maximum delay deviation of the signal of the terminal device.

According to this embodiment of the present disclosure, a plurality of possible delay deviations of the signal of the terminal device are considered, so that a channel delay can be better resisted. The maximum delay deviation includes delay deviations of data signals transmitted by different transmit points during downlink multipoint transmission. The maximum delay deviation may further include delay deviations of data transmitted by users in different distances during uplink asynchronous multiuser access.

In an optional implementation, the interpolation operation specifically includes: performing the interpolation operation on the first signal sequence to obtain a third signal sequence; and performing a first-phase rotation on the third signal sequence to obtain the second signal sequence.

In an optional implementation, the interpolation operation specifically includes: performing an inverse discrete Fourier transform IDFT on the first signal sequence to obtain a fourth signal sequence; adding ZH 0s to the head of the fourth signal sequence, and adding ZT 0s to the tail of the fourth signal sequence, to obtain a fifth signal sequence, where both ZH and ZT are integers greater than 0; and performing a discrete Fourier transform DFT on the fifth signal sequence to obtain the second signal sequence, where the length of the second signal sequence equals a sum of the length of the first signal sequence, ZH, and ZT.

According to this embodiment of the present disclosure, an adaptive ZT effect of an OFDM symbol is achieved in time domain by performing a generalized interpolation operation or a DFT interpolation operation, so that a transmitted time-domain signal can better resist a delay deviation.

In an optional implementation, the first signal sequence includes at least one first pilot symbol, the first pilot symbol is obtained by performing a second-phase rotation on a second pilot symbol, and the second pilot symbol is used by the receive end to perform at least one of channel measurement and channel estimation.

In an optional implementation, the first signal sequence includes at least one first pilot symbol, the first pilot symbol is obtained by performing a third-phase rotation on a second pilot symbol, and the second pilot symbol is used by the receive end to perform at least one of channel measurement and channel estimation.

In an optional implementation, the mapping the second signal sequence onto a subcarrier to obtain a second signal sequence that is on the subcarrier specifically includes: mapping at least one group of second signal sequences onto the subcarrier to obtain at least one group of second signal sequences that are on the subcarrier.

According to this embodiment of the present disclosure, a block-based interpolation operation is performed, so that resource blocks of one user are discretely distributed in transmission bandwidth. In this way, a target user can obtain a better frequency-domain diversity effect, and scheduling for another user can also be supported more flexibly.

In an optional implementation, the first signal sequence includes at least one first pilot symbol and at least one data symbol, where the at least one first pilot symbol and the at least one data symbol constitute the first signal sequence according to a first predefined rule; and the first predefined rule is as follows: in the first signal sequence, at intervals of a first predefined quantity of data symbols, there is a candidate first pilot symbol location, and at least one candidate first pilot symbol location is selected to interpolate the first pilot symbol, where the first predefined quantity is determined based on the interpolation parameter.

According to this embodiment of the present disclosure, a multicarrier-based interpolation operation may be implemented, and a pilot symbol may be interpolated to some subcarriers of an OFDM symbol. A location before interpolation of the pilot symbol is preset based on the interpolation parameter, so that a quantity, amplitudes, and phases of pilot symbols keep unchanged after interpolation. Therefore, the pilot symbol does not change relative to the receive end. To be specific, pilot processing of the receive end is identical in a scenario in which the transmit end uses an interpolation solution and in a scenario in which the transmit end does not use an interpolation solution.

In an optional implementation, the first signal sequence includes at least one 0 and at least one data symbol, where the at least one 0 and the at least one data symbol constitute the first signal sequence according to a second predefined rule; and the second predefined rule is as follows: in the first signal sequence, at intervals of a first predefined quantity of data symbols, there is a candidate location for interpolating a 0, and at least one candidate location for interpolating a 0 is selected to interpolate the 0, where the first predefined quantity is determined based on the interpolation parameter.

It should be noted that both the first-phase rotation and the second-phase rotation mentioned in this embodiment of the present disclosure are performed to keep a pilot symbol unchanged relative to the receive end. To be specific, pilot processing of the receive end is identical in a scenario in which the transmit end uses an interpolation solution and in a scenario in which the transmit end does not use an interpolation solution.

In an optional implementation, at intervals of a second predefined quantity of subcarriers, there is a candidate second pilot symbol location; the second pilot symbol is used to replace a symbol that is of the second signal sequence and that is on a subcarrier on which at least one candidate second pilot symbol location resides; the second predefined quantity is determined based on the interpolation parameter; the second predefined quantity is greater than the first predefined quantity; in the second signal sequence, a location replaced by the second pilot symbol is related to a location to which the 0 is interpolated in the first signal sequence; and the second pilot symbol is used by the receive end to perform at least one of channel measurement and channel estimation.

According to this embodiment of the present disclosure, to keep a pilot symbol unchanged relative to the receive end during interpolation, a 0 may be placed on a pilot location in the first signal sequence before interpolation, and finally, the pilot symbol is used to replace a symbol on a corresponding pilot location in the second signal sequence. This implementation is a replacement solution of directly interpolating valid pilot symbol data to the first signal sequence.

In an optional implementation, the method further includes: sending information related to the interpolation parameter, where the information related to the interpolation parameter is used by the receive end to determine the interpolation parameter.

Further, the data transmission method provided in the first aspect may include the following possible implementations:

In an optional implementation, when the first signal sequence includes at least one first pilot symbol or at least one 0, the interpolation parameter is a fixed preset value.

According to this embodiment of the present disclosure, an interpolation parameter of a pilot symbol may be fixed, to avoid a case in which different intervals of locations to which a pilot can be interpolated are corresponding to different interpolation parameters because the interpolation parameter is changed based on a channel delay variation. When the time-domain signal does not include the pilot symbol, the interpolation parameter is variable.

In an optional implementation, when the first signal sequence includes only at least one data symbol, the interpolation parameter is one of a plurality of interpolation parameters; when the first signal sequence includes at least one first pilot symbol or at least one 0, the first predefined quantity is determined based on the plurality of interpolation parameters.

According to this embodiment of the present disclosure, a pilot symbol design in which an interpolation parameter is variable may be used, a location for interpolating a pilot symbol is determined based on a plurality of optional interpolation parameters in a delay range, so that pilot symbol interpolation intervals are the same in a case of a plurality of interpolation parameters. In a specific example, according to this embodiment of the present disclosure, a plurality of pilot pattern designs similar to a pilot pattern design in a 5G standard are implemented, and for a DMRS pilot, two identical pilot patterns may be used to perform adaptive switching of different interpolation parameters, so that an orthogonal effect can be ensured for the DMRS pilot when different interpolation parameters are used by different transmit points in CoMP.

In an optional implementation, the first signal sequence further includes at least one fourth pilot symbol, and the at least one fourth pilot symbol, the at least one first pilot symbol, and the at least one data symbol constitute the first signal sequence according to a third predefined rule.

Specifically, the third predefined rule is as follows: at intervals of a first predefined quantity of data symbols, there is a candidate first pilot symbol location, at least one candidate first pilot symbol location and a neighboring location of the at least one candidate first pilot symbol location are selected to respectively interpolate the first pilot symbol and the fourth pilot symbol; and the first predefined quantity is determined based on the interpolation parameter.

According to this embodiment of the present disclosure, on a basis that a pilot is interpolated to an integer multiple interpolation point, a pilot is also interpolated to a location beside the integer multiple interpolation point, thereby improving pilot symbol density. When the pilot symbol density is relatively low, quality of channel estimation, noise estimation, or the like is affected, and a final throughput is affected. By improving density of usable pilot locations, more ports are supported, or an effect that more data symbols can be transmitted when a same quantity of pilot symbols are used is achieved.

In an optional implementation, the fourth pilot symbol is obtained by performing a third-phase rotation on a third pilot symbol, and the third pilot symbol is used by the receive end to perform at least one of channel measurement and channel estimation.

In an optional implementation, neighboring locations at intervals of a second predefined quantity of subcarriers are candidate third pilot symbol locations; the third pilot symbol is used to replace a symbol that is of the second signal sequence and that is on a subcarrier on which at least one candidate third pilot symbol location resides; the second predefined quantity is determined based on the interpolation parameter; the second predefined quantity is greater than the first predefined quantity; and in the second signal sequence, a location replaced by the third pilot symbol is related to a location to which the fourth pilot symbol is interpolated in the first signal sequence.

In an optional implementation, when at least one transmitting apparatus coordinately sends data to the receive end, the at least one transmitting apparatus includes a service transmitting apparatus and a coordinated transmitting apparatus, and the coordinated transmitting apparatus determines the interpolation parameter based on a delay deviation of the coordinated transmitting apparatus relative to the service transmitting apparatus, so that the receive end performs joint MIMO receiving on signals of the at least one transmitting apparatus.

According to this embodiment of the present disclosure, a plurality of transmission points with different timings can be ensured to select proper interpolation parameters based on respective delay deviations to send time-domain signals, and the receive end can be ensured to perform receiving in a joint MIMO manner, so that a processing delay is shorter.

In an optional implementation, the head and the tail of the second signal sequence each include a plurality pieces of data less than a preset threshold. Specifically, the data less than preset threshold may be data that is approximate to 0.

In a possible example, a generalized interpolation operation is performed on frequency-domain data of the first signal sequence to obtain a frequency-domain second signal sequence. There are ZH pieces of data that are approximate to 0 at the head of the frequency-domain second signal sequence, and there are ZT pieces of data that are approximate to 0 at the tail of the frequency-domain second signal sequence.

In a possible example, a DFT interpolation operation is performed on the first signal sequence to perform an IDFT on the first signal sequence, to obtain a first time-domain symbol, ZH 0s and ZT 0s are respectively added to the head and the tail of the first time-domain symbol to obtain a second time-domain symbol, and a DFT is performed on the second time-domain symbol to obtain the frequency-domain second signal sequence. A frequency-domain interpolation effect is achieved by adding 0s to both ends of a time-domain signal.

In an optional implementation, a ratio of the length of the second signal sequence to the length of the first signal sequence is an interpolation ratio. When the interpolation ratio is 2, the transmitting the time-domain signal further includes: including, by the time-domain signal, a first time-domain signal and a second time-domain signal, where a time length occupied by the first time-domain signal is the same as a time length occupied by the second time-domain signal; clipping the first time-domain signal and the second time-domain signal to obtain a third time-domain signal and a fourth time-domain signal, respectively, where the second time-domain signal delays for a half cycle in time domain compared with the first time-domain signal, a time length occupied by the third time-domain signal is half of the time length occupied by the first time-domain signal, and a time length occupied by the fourth time-domain signal is half of the time length occupied by the second time-domain signal; mixing the third time-domain signal and the fourth time-domain signal to obtain a fifth time-domain signal; and transmitting the fifth time-domain signal, where the half cycle is half of the time length occupied by the first time-domain signal.

In an optional implementation, an IFFT/2 window function is used to clip the first time-domain signal and the second time-domain signal, to remove a plurality pieces of data that are less than the preset threshold and that are at the head and the tail of the first time-domain signal or the second time-domain signal.

In an optional implementation, when the interpolation ratio is 4, the transmitting the time-domain signal further includes: including, by the time-domain signal, a sixth time-domain signal, a seventh time-domain signal, an eighth time-domain signal, and a ninth time-domain signal, where a time length occupied by the sixth time-domain signal, a time length occupied by the seventh time-domain signal, a time length occupied by the eighth time-domain signal, and a time length occupied by the ninth time-domain signal are the same; clipping the sixth time-domain signal, the seventh time-domain signal, the eighth time-domain signal, and the ninth time-domain signal, to obtain a tenth time-domain signal, an eleventh time-domain signal, a twelfth time-domain signal, and a thirteenth time-domain signal, respectively, where the seventh time-domain signal delays for a quarter of a cycle in time domain compared with the sixth time-domain signal, the eighth time-domain signal delays for a quarter of a cycle in time domain compared with the seventh time-domain signal, the ninth time-domain signal delays for a quarter of a cycle in time domain compared with the eighth time-domain signal, a time length occupied by the tenth time-domain signal is a quarter of the time length occupied by the sixth time-domain signal, a time length occupied by the eleventh time-domain signal is a quarter of the time length occupied by the seventh time-domain signal, a time length occupied by the twelfth time-domain signal is a quarter of the time length occupied by the eighth time-domain signal, and a time length occupied by the thirteenth time-domain signal is a quarter of the time length occupied by the ninth time-domain signal; mixing the tenth time-domain signal, the eleventh time-domain signal, the twelfth time-domain signal, and the thirteenth time-domain signal, to obtain a fourteenth time-domain signal; and transmitting the fourteenth time-domain signal, where the quarter of the cycle is a quarter of the time length occupied by the sixth time-domain signal.

In an optional implementation, an IFFT/4 window function is used to clip the sixth time-domain signal, the seventh time-domain signal, the eighth time-domain signal, and the ninth time-domain signal, to remove a plurality pieces of data that are less than the preset threshold and that are at the heads and the tails of the sixth time-domain signal, the seventh time-domain signal, the eighth time-domain signal, and the ninth time-domain signal.

According to this embodiment of the present disclosure, a shorter time interval may be constructed in time domain, to achieve an effect of a wider subcarrier spacing. In addition, no mutual ICI interference exists between different services. Therefore, frequency-domain guard bands can be reduced, and a throughput is effectively improved.

In an optional implementation, the interpolation operation includes one or more of the following: discrete Fourier transform DFT interpolation, spline interpolation, first-order interpolation, and high-order interpolation.

According to a second aspect, an embodiment of the present disclosure provides another data transmission method. The method includes: receiving a time-domain signal; performing a fast Fourier transform FFT on the time-domain signal to obtain a sixth signal sequence that is on a subcarrier; demodulating the sixth signal sequence to obtain a seventh signal sequence; performing a de-interpolation operation on the seventh signal sequence to obtain an eighth signal sequence, where the eighth signal sequence includes soft information of a data symbol, and a length of the eighth signal sequence is less than a length of the seventh signal sequence; and decoding the soft information of the data symbol to obtain the data symbol.

In an optional implementation, before the demodulating the sixth signal sequence, the method further includes: obtaining a pilot symbol; and performing channel estimation based on the pilot symbol, to obtain channel-related information; and the demodulating the sixth signal sequence to obtain a seventh signal sequence includes: demodulating the sixth signal sequence based on the channel-related information, to obtain the seventh signal sequence.

In an optional implementation, before the performing a de-interpolation operation on the seventh signal sequence, the method further includes: determining an interpolation parameter; and the performing a de-interpolation operation on the seventh signal sequence to obtain an eighth signal sequence includes: performing the de-interpolation operation on the seventh signal sequence based on the interpolation parameter, to obtain the eighth signal sequence.

In an optional implementation, the de-interpolation operation specifically includes: performing a first-phase de-rotation operation on the seventh signal sequence to obtain a ninth signal sequence, and performing the de-interpolation operation on the ninth signal sequence to obtain the eighth signal sequence.

In an optional implementation, the de-interpolation operation specifically includes: performing an inverse discrete Fourier transform IDFT on the seventh signal sequence to obtain a tenth signal sequence; deleting ZH 0s from the head of the tenth signal sequence, and deleting ZT 0s from the tail of the tenth signal sequence, to obtain an eleventh signal sequence; and performing a discrete Fourier transform DFT on the eleventh signal sequence to obtain the eighth signal sequence, where the length of the eighth signal sequence equals a value obtained by subtracting ZH and ZT from the length of the seventh signal sequence.

In an optional implementation, the demodulating the sixth signal sequence to obtain a seventh signal sequence specifically includes: demodulating the sixth signal sequence to obtain at least one group of seventh signal sequences.

In an optional implementation, the method further includes: receiving information related to the interpolation parameter, where the information related to the interpolation parameter is used to determine the interpolation parameter.

In an optional implementation, the seventh signal sequence further includes the pilot symbol, where the pilot symbol is on a location that is in the seventh signal sequence and that satisfies a fourth predefined rule; and the fourth predefined rule is as follows: the pilot symbol is on a location at intervals of a fourth predefined quantity of data symbols in at least one seventh signal sequence, and the fourth predefined quantity is determined based on the interpolation parameter.

In an optional implementation, the de-interpolation operation includes one or more of the following: discrete Fourier transform DFT de-interpolation, spline de-interpolation, first-order de-interpolation, and high-order de-interpolation.

According to a third aspect, an embodiment of the present disclosure provides a communications device, including: an interpolation unit, configured to perform an interpolation operation on a first signal sequence to obtain a second signal sequence; a mapping unit, configured to map the second signal sequence onto a subcarrier to obtain a second signal sequence that is on the subcarrier; an IFFT unit, configured to perform an inverse fast Fourier transform IFFT on the second signal sequence that is on the subcarrier, to obtain a time-domain signal, and a transmitting unit, configured to transmit the time-domain signal.

In an optional implementation, the communications device further includes: a determining unit, configured to determine an interpolation parameter; and the interpolation unit is specifically configured to perform the interpolation operation on the first signal sequence based on the interpolation parameter, to obtain the second signal sequence, where a length of the second signal sequence is greater than a length of the first signal sequence.

In an optional implementation, the communications device further includes: an obtaining unit, configured to obtain a maximum delay deviation of a signal of a terminal device, where the signal of the terminal device is a wireless signal sent to the terminal device or a wireless signal sent by the terminal device, and the maximum delay deviation is a difference between an earliest time and a latest time at which the signal of the terminal device arrives at a receive end through a wireless channel after the signal of the terminal device is sent from a transmit end; and the determining unit is specifically configured to determine the interpolation parameter based on the maximum delay deviation of the signal of the terminal device.

In an optional implementation, the interpolation unit is specifically configured to: perform the interpolation operation on the first signal sequence to obtain a third signal sequence; and perform a first-phase rotation on the third signal sequence to obtain the second signal sequence.

In an optional implementation, the interpolation unit is specifically configured to: perform an inverse discrete Fourier transform IDFT on the first signal sequence to obtain a fourth signal sequence; add ZH 0s to the head of the fourth signal sequence, and add ZT 0s to the tail of the fourth signal sequence, to obtain a fifth signal sequence, where both ZH and ZT are integers greater than or equal to 0, and at least one of ZH and ZT is a positive integer; perform a discrete Fourier transform DFT on the fifth signal sequence to obtain the second signal sequence, where the length of the second signal sequence equals a sum of the length of the first signal sequence, ZH, and ZT.

In an optional implementation, the mapping unit is specifically configured to map at least one group of second signal sequences onto the subcarrier to obtain at least one group of second signal sequences that are on the subcarrier.

In an optional implementation, the first signal sequence includes at least one first pilot symbol and at least one data symbol, where the at least one first pilot symbol and the at least one data symbol constitute the first signal sequence according to a first predefined rule; and the first predefined rule is as follows: in the first signal sequence, at intervals of a first predefined quantity of data symbols, there is a candidate first pilot symbol location, and at least one candidate first pilot symbol location is selected to interpolate the first pilot symbol, where the first predefined quantity is determined based on the interpolation parameter.

In an optional implementation, the first signal sequence includes at least one 0 and at least one data symbol, where the at least one 0 and the at least one data symbol constitute the first signal sequence according to a second predefined rule; and the second predefined rule is as follows: in the first signal sequence, at intervals of a first predefined quantity of data symbols, there is a candidate location for interpolating a 0, and at least one candidate location for interpolating a 0 is selected to interpolate the 0, where the first predefined quantity is determined based on the interpolation parameter.

In an optional implementation, the first pilot symbol is obtained by performing a second-phase rotation on a second pilot symbol, and the second pilot symbol is used by the receive end to perform at least one of channel measurement and channel estimation.

In an optional implementation, the mapping unit is further specifically configured to: at intervals of a second predefined quantity of subcarriers, use the second pilot symbol to replace a symbol in the second signal sequence that is on the subcarrier, where the second predefined quantity is determined based on the interpolation parameter, the second predefined quantity is greater than the first predefined quantity, and the second pilot symbol is used by the receive end to perform at least one of channel measurement and channel estimation.

In an optional implementation, the communications device further includes a sending unit, configured to send information related to the interpolation parameter, where the information related to the interpolation parameter is used by the receive end to determine the interpolation parameter.

According to a fourth aspect, an embodiment of the present disclosure provides another communications device, including: a receiving unit, configured to receive a time-domain signal; an FFT unit, configured to perform a fast Fourier transform FFT on the time-domain signal to obtain a sixth signal sequence that is on a subcarrier; a demodulation unit, configured to demodulate the sixth signal sequence to obtain a seventh signal sequence; a de-interpolation unit, configured to perform a de-interpolation operation on the seventh signal sequence to obtain an eighth signal sequence, where the eighth signal sequence includes soft information of a data symbol, and a length of the eighth signal sequence is less than a length of the seventh signal sequence; and a decoding unit, configured to decode the soft information of the data symbol to obtain the data symbol.

In an optional implementation, the communications device further includes: an obtaining unit, configured to obtain a pilot symbol; and a channel estimation unit, configured to perform channel estimation based on the pilot symbol, to obtain channel-related information; and the demodulation unit is specifically configured to demodulate the sixth signal sequence based on the channel-related information, to obtain the seventh signal sequence.

In an optional implementation, the communications device further includes: a determining unit, configured to determine an interpolation parameter; and the de-interpolation unit is specifically configured to perform the de-interpolation operation on the seventh signal sequence based on the interpolation parameter, to obtain the eighth signal sequence.

In an optional implementation, the de-interpolation operation specifically includes: performing a first-phase de-rotation operation on the seventh signal sequence to obtain a ninth signal sequence; and performing the de-interpolation operation on the ninth signal sequence to obtain the eighth signal sequence.

In an optional implementation, the de-interpolation unit is specifically configured to: perform an inverse discrete Fourier transform IDFT on the seventh signal sequence to obtain a tenth signal sequence; delete ZH 0s from the head of the tenth signal sequence, and delete ZT 0s from the tail of the tenth signal sequence, to obtain an eleventh signal sequence; and perform a discrete Fourier transform DFT on the eleventh signal sequence to obtain the eighth signal sequence, where the length of the eighth signal sequence equals a value obtained by subtracting ZH and ZT from the length of the seventh signal sequence.

In an optional implementation, the de-interpolation unit is specifically configured to demodulate the sixth signal sequence to obtain at least one group of seventh signal sequences.

In an optional implementation, the communications device further includes a receiving unit, configured to receive information related to the interpolation parameter, where the information related to the interpolation parameter is used by a receive end to determine the interpolation parameter.

According to the foregoing technical solutions, and the data transmission method and the communications device that are provided in the embodiments of the present disclosure, the transmit end may perform interpolation on a modulated symbol that is mapped onto frequency domain, so that an adaptive ZT effect of an OFDM symbol is achieved in time domain, and a transmitted time-domain signal can better resist a delay deviation.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

FIG. 4 is a schematic diagram of an interpolation matrix according to an embodiment of the present disclosure;

DESCRIPTION OF EMBODIMENTS

The technical solutions in the embodiments of the present disclosure are clearly described in the following with reference to the accompanying drawings. Apparently, the described embodiments are merely some but not all of the embodiments of the present disclosure. All other embodiments obtained by a person of ordinary skill in the art based on the embodiments of the present disclosure without creative efforts shall fall within the protection scope of the present application.

A network architecture and a service scenario that are described in the embodiments of the present disclosure are intended to describe the technical solutions in the embodiments of the present disclosure more clearly, and do not constitute any limitation on the technical solutions provided in the embodiments of the present disclosure. A person of ordinary skill in the art may understand that with evolution of the network architecture and emergence of a new service scenario, the technical solutions provided in the embodiments of the present disclosure are also applicable to a similar technical problem.

Technologies described in the embodiments of the present disclosure are applicable to a subsequent evolved system of an LTE system, such as a fifth generation (5G) system. In the embodiments of the present disclosure, terms "network" and "system" are usually used alternately, but a person skilled in the art can understand their meanings.

Figure 1:
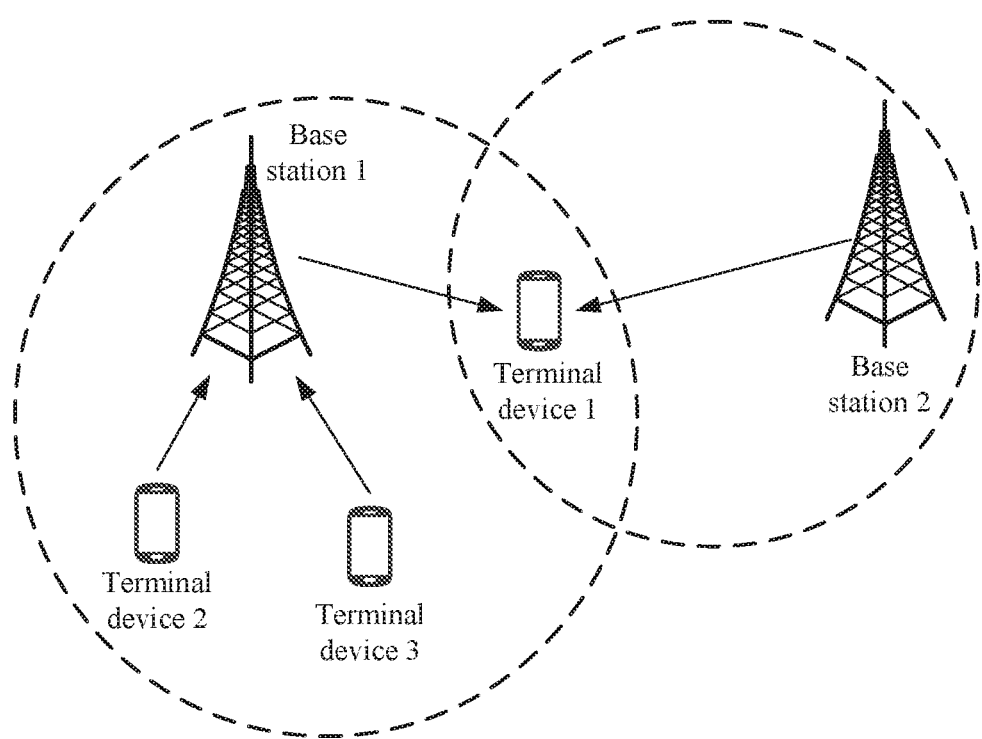
FIG. 1 is an architectural diagram of a communications system according to an embodiment of the present disclosure.

FIG. 1 is an architectural diagram of a communications system according to an embodiment of the present disclosure. As shown in FIG. 1, a plurality of transmitting apparatuses and a plurality of receiving apparatuses are included. Uplink or downlink data transmission is performed between the plurality of transmitting apparatuses and the plurality of receiving apparatuses.

The transmitting apparatus and the receiving apparatus in the embodiments of the present disclosure may be any transmit end apparatus and receive end apparatus that perform data transmission in a wireless manner. The transmitting apparatus and the receiving apparatus may be any apparatus having a wireless transceiving function, including but not limited to: a NodeB, an evolved NodeB (eNodeB), a base station in a future fifth generation (5G) communications system, an access point in a Wi-Fi system, a wireless relay node, and a wireless backhaul node, user equipment (terminal device). The terminal device may also be referred to as a terminal, a mobile station (MS), a mobile terminal (MT), or the like. The terminal device may communicate with one or more core networks by using a radio access network (RAN), and the terminal device may also directly perform wireless communication with another terminal device.

The embodiments of the present disclosure may be applied to scenarios such as downlink data transmission from a base station to a terminal device, uplink data transmission from a terminal device to a base station, device-to-device (D2D) data transmission, and wireless backhaul data transmission in a wireless communications system. The application scenarios are not limited in the embodiments of the present disclosure.

The application scenarios of the embodiments of the present disclosure are described by using terminal devices 1 to 3, a base station 1, and a base station 2 that are shown in FIG. 1 as an example.

In a possible scenario, the base station 1 and the base station 2 perform downlink coordinated multipoint transmission with the terminal device 1. When the base station 1 and the base station 2 use different clock sources, a delay deviation exists between signals sent by the base station 1 and the base station 2.

In another possible scenario, the terminal device 1 and the terminal device 2 communicate with the base station 1. Wireless environments in which the terminal device 1 and the terminal device 2 reside have a great difference. Consequently, a maximum delay deviation (delay spread) between signals of the terminal device 1 and the terminal device 2 is very large.

An embodiment of the present disclosure provides a data transmission method. Based on a delay deviation of a signal of a terminal device, an interpolation parameter is configured for a signal sent by a transmit end of a base station or the terminal device, to form zero power tails in different lengths, so as to avoid the foregoing delay deviation. The signal of the terminal device is a wireless signal sent to the terminal device or a wireless signal sent by the terminal device.

Specifically, the delay deviation of the signal of the terminal device may further include delay deviations caused by signal propagation of different transmit ends relative to a receive end, and a delay spread of a wireless channel.

In a possible implementation, the transmit end may configure the interpolation parameter in an adaptive manner. For example, the transmit end configures a corresponding interpolation parameter based on an obtained maximum channel delay deviation. Alternatively, when the transmit end is initially connected to a wireless network, the transmit end uses an interpolation parameter to configure a relatively long zero power tail, to resist a relatively large delay deviation. In a subsequent process, the transmit end may re-configure an interpolation parameter based on an obtained maximum channel delay deviation, so as to ensure data transmission efficiency.

According to the data transmission method provided in this embodiment of the present disclosure, to adjust a zero tail (ZT) in the adaptive manner, the receive end measures a maximum channel delay deviation of a current time point, and feeds back a quantized delay deviation to the transmit end by using an uplink control message; or the transmit end directly obtains a maximum channel delay deviation through measurement. The transmit end selects a proper interpolation parameter based on the obtained maximum delay deviation to perform ZT-OFDM modulation. In addition, the transmit end sends the selected interpolation parameter to the receive end by using a control message, so as to ensure that the receive end performs a correct de-interpolation operation.

It can be understood that the base station and the terminal device perform data transmission based on an OFDM symbol, and the data transmission method provided in this embodiment of the present disclosure may also be understood as an adaptive ZT OFDM symbol transmission method.

Figure 2:
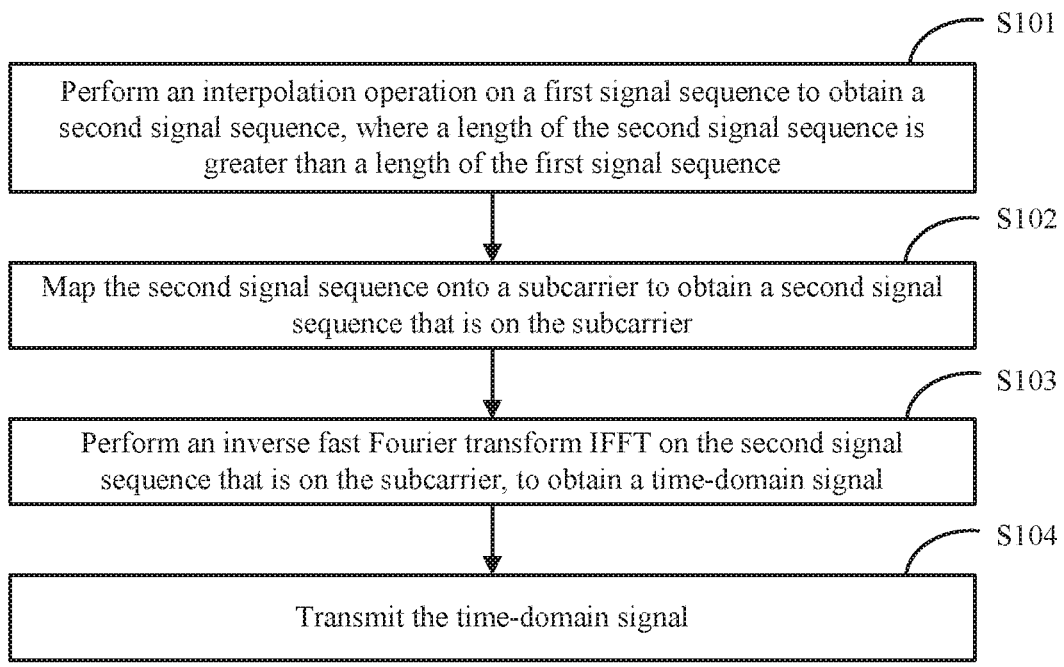
FIG. 2 is a schematic flowchart of a data transmission method according to an embodiment of the present disclosure.

FIG. 2 is a schematic flowchart of a data transmission method according to an embodiment of the present disclosure. In this embodiment, the method is performed by a transmitting apparatus. As shown in FIG. 2, this embodiment includes the following steps.

Step S101. The transmitting apparatus performs an interpolation operation on a first signal sequence to obtain a second signal sequence, where a length of the second signal sequence is greater than a length of the first signal sequence.

It can be understood that, for downlink data transmission from a base station to a terminal device, the transmitting apparatus is the base station; for uplink data transmission from a terminal device to a base station, the transmitting apparatus is the terminal device; for D2D data transmission, the transmitting apparatus is a terminal device; and for wireless backhaul data transmission, the transmitting apparatus is a wireless backhaul node.

Preferably, before the performing an interpolation operation on a first signal sequence, the method further includes: determining an interpolation parameter; and the performing an interpolation operation on a first signal sequence to obtain a second signal sequence includes: performing the interpolation operation on the first signal sequence based on the interpolation parameter, to obtain the second signal sequence.

Preferably, before the determining an interpolation parameter, the method further includes: obtaining a maximum delay deviation of a signal of a terminal device, where the signal of the terminal device is a wireless signal sent to the terminal device or a wireless signal sent by the terminal device, and the maximum delay deviation is a difference between an earliest time and a latest time at which the signal of the terminal device arrives at a receiving apparatus through a wireless channel after the signal of the terminal device is sent from a transmit end; and the determining an interpolation parameter includes: determining the interpolation parameter based on the maximum delay deviation of the signal of the terminal device. The maximum delay deviation herein may include at least one of the following delay deviations: a delay deviation caused by time asynchronization between different transmit points; a propagation delay deviation of signals arriving at the receiving apparatus from different transmit points; and a delay spread of signals arriving at the receiving apparatus from a same transmit point.

It can be understood that the terminal device may measure the signal sent to the terminal device, to obtain the maximum delay deviation, and then report the maximum delay deviation to a network device; or a network device measures the signal from the terminal device to obtain the maximum delay deviation; or in a device-to-device (D2D) communication scenario, the terminal device measures a signal from another terminal device, to obtain the maximum delay deviation, and then reports the maximum delay deviation to a network device. The network device herein may be a base station.

The interpolation operation may specifically include typical interpolation algorithms such as discrete Fourier transform DFT interpolation, spline interpolation, first-order interpolation, and high-order interpolation.

Preferably, the interpolation operation specifically includes: performing an inverse discrete Fourier transform IDFT on the first signal sequence to obtain a fourth signal sequence; adding ZH 0s to the head of the fourth signal sequence, and adding ZT 0s to the tail of the fourth signal sequence, to obtain a fifth signal sequence, where both ZH and ZT are integers greater than 0; and performing a discrete Fourier transform DFT on the fifth signal sequence to obtain the second signal sequence, where the length of the second signal sequence equals a sum of the length of the first signal sequence, ZH, and ZT.

Preferably, the first signal sequence includes at least one data symbol.

Preferably, the first signal sequence includes at least one first pilot symbol, the first pilot symbol is obtained by performing a third-phase rotation on a second pilot symbol, and the second pilot symbol is used by the receiving apparatus to perform at least one of channel measurement and channel estimation.

Preferably, the first signal sequence further includes at least one data symbol, where the at least one first pilot symbol and the at least one data symbol constitute the first signal sequence according to a first predefined rule; and the first predefined rule is as follows: in the first signal sequence, at intervals of a first predefined quantity of data symbols, there is a candidate first pilot symbol location, and at least one candidate first pilot symbol location is selected to interpolate the first pilot symbol, where the first predefined quantity is determined based on the interpolation parameter.

Step S102. Map the second signal sequence onto a subcarrier to obtain a second signal sequence that is on the subcarrier.

Preferably, at least one group of second signal sequences are mapped onto the subcarrier to obtain at least one group of second signal sequences that are on the subcarrier.

Step S103. Perform an inverse fast Fourier transform IFFT on the second signal sequence that is on the subcarrier, to obtain a time-domain signal.

Specifically, for multilayer MIMO transmission, before the IFFT is performed on the second signal sequence that is on the subcarrier, the method further includes operations such as layer mapping and precoding. Refer to the related prior art. Details are not described herein.

The time-domain signal may be referred to as an OFDM symbol, and a frequency resource occupied by the OFDM symbol is system bandwidth of a cell. A ZP adding operation or CP adding operation may be performed on a time-domain signal obtained after interpolation processing and the IFFT are performed, so that the OFDM symbol can be in a predefined time length, thereby further eliminating intersymbol interference.

Step S104. Transmit the time-domain signal.

Specifically, the time-domain signal is transmitted. Alternatively, the time-domain signal to which a ZP or CP is added is transmitted.

Further, information related to the interpolation parameter is sent, and the information related to the interpolation parameter is used by the receiving apparatus to determine the interpolation parameter.

Figure 3:
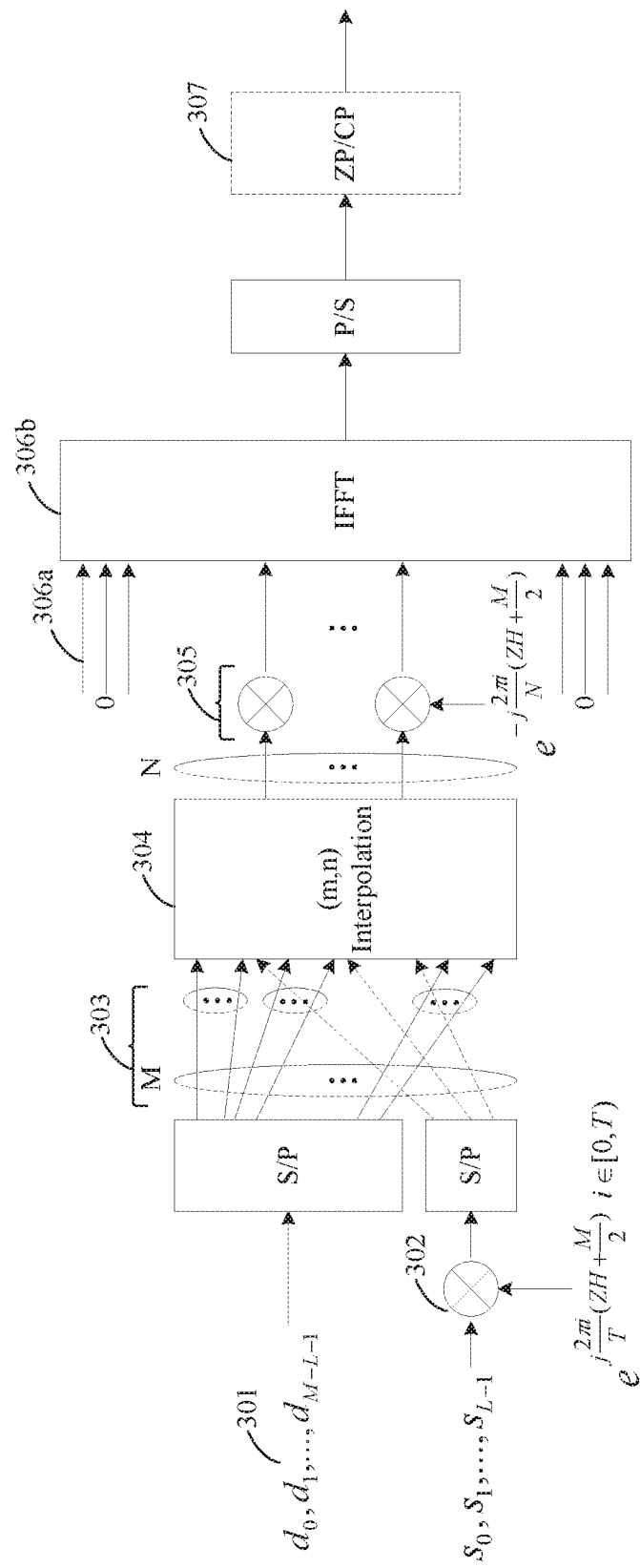
FIG. 3 shows a data transmission method and apparatus that are based on generalized frequency-domain interpolation according to an embodiment of the present disclosure.

By using FIG. 3 as an example, the following describes a specific example of the interpolation operation provided in this embodiment of the present disclosure.

FIG. 3 shows a data transmission method and apparatus that are based on generalized frequency-domain interpolation according to an embodiment of the present disclosure. It is assumed that an interpolation parameter in this embodiment is (m, n). If resources allocated by a system to a user are N subcarriers, M symbols need to be generated in total before interpolation in this solution. The M symbols are converted to N symbols in frequency domain through interpolation by using an (m, n) fractional multiple interpolation filter. In addition, it is set that $$T = \frac{M}{m} = \frac{N}{n},$$

and T is a quantity of corresponding integer multiple interpolation points. This embodiment mainly includes the following steps.

Step 301. Generate at least one data symbol by performing channel coding, rate matching, scrambling, and modulation on user data bits.

Specifically, the at least one data symbol may be M−L QAM symbols.

Step 302. Generate at least one second pilot symbol based on a cell number, a frame number, and the like. The second pilot symbol is used by a receiving apparatus to perform at least one of channel measurement and channel estimation.

To ensure that the receiving apparatus can transparently receive a pilot symbol, and perform a second-phase rotation on the at least one second pilot symbol to obtain at least one first pilot symbol, specifically, the at least one second pilot symbol may be L(L≤T) pilot symbols, and the second-phase rotation may be represented by multiplying a phase rotation factor $$e^{\frac{j2\pi}{T}i(ZH+\frac{M}{2})}.$$

i∈[0, T), and i is determined depending on a candidate first pilot symbol location that is of a first signal sequence in step 303 and to which the first pilot symbol is specifically interpolated. ZH is a quantity of symbols approximate to 0 that are at the head of N pieces of data corresponding to time domain after the interpolation processing.

It should be noted that the transparently receiving a pilot symbol by the receiving apparatus means that whether a transmit end uses an interpolation solution is transparent for receiving a pilot by the receiving apparatus. To be specific, pilot processing of the receiving apparatus is identical in a scenario in which the transmit end uses the interpolation solution and in a scenario in which the transmit end does not use the interpolation solution.

Step 303. Constitute a first signal sequence according to a first predefined rule by using at least one first pilot symbol and the at least one data symbol.

The first predefined rule is as follows: in the first signal sequence, at intervals of a first predefined quantity of data symbols, there is a candidate first pilot symbol location, and at least one candidate first pilot symbol location is selected to interpolate the first pilot symbol, where the first predefined quantity is determined based on the interpolation parameter.

Specifically, the first predefined quantity is m. First, serial-to-parallel (S/P) conversion is performed on the at least one data symbol and the at least one first pilot symbol. The at least one data symbol and the at least one first pilot symbol on which S/P conversion is performed are arranged into an M-length first signal sequence through mixed interpolation. The first pilot symbol needs to be interpolated to a location of an integer multiple interpolation point, the location is corresponding to an $(i*m)^{th}$ location of the M-length first signal sequence, and i=0, 1, . . . , T−1. After (m, n) fractional multiple interpolation is performed, the location is corresponding to an $(i*n)^{th}$ location of an N-length sequence, and a value keeps unchanged.

It should be noted that a quantity of first pilot symbols is less than or equal to T, and the integer multiple interpolation point is the candidate first pilot symbol location.

Step 304. Perform an interpolation operation on the first signal sequence to obtain a third signal sequence.

Specifically, the M-length first signal sequence is output, by using the (m, n) fractional multiple interpolation filter, as an N-length third signal sequence obtained after interpolation.

The interpolation filter may be various typical interpolation algorithms such as DFT interpolation, spline interpolation, first-order interpolation, and high-order interpolation.

It should be noted that an operation of the interpolation filter provided in this embodiment of the present disclosure is equivalent to multiplying another matrix before a unit matrix of multicarrier modulation in an existing LTE system. Specifically, a precoding matrix may be considered as the unit matrix because of direct mapping in the multicarrier modulation.

Figure 4:
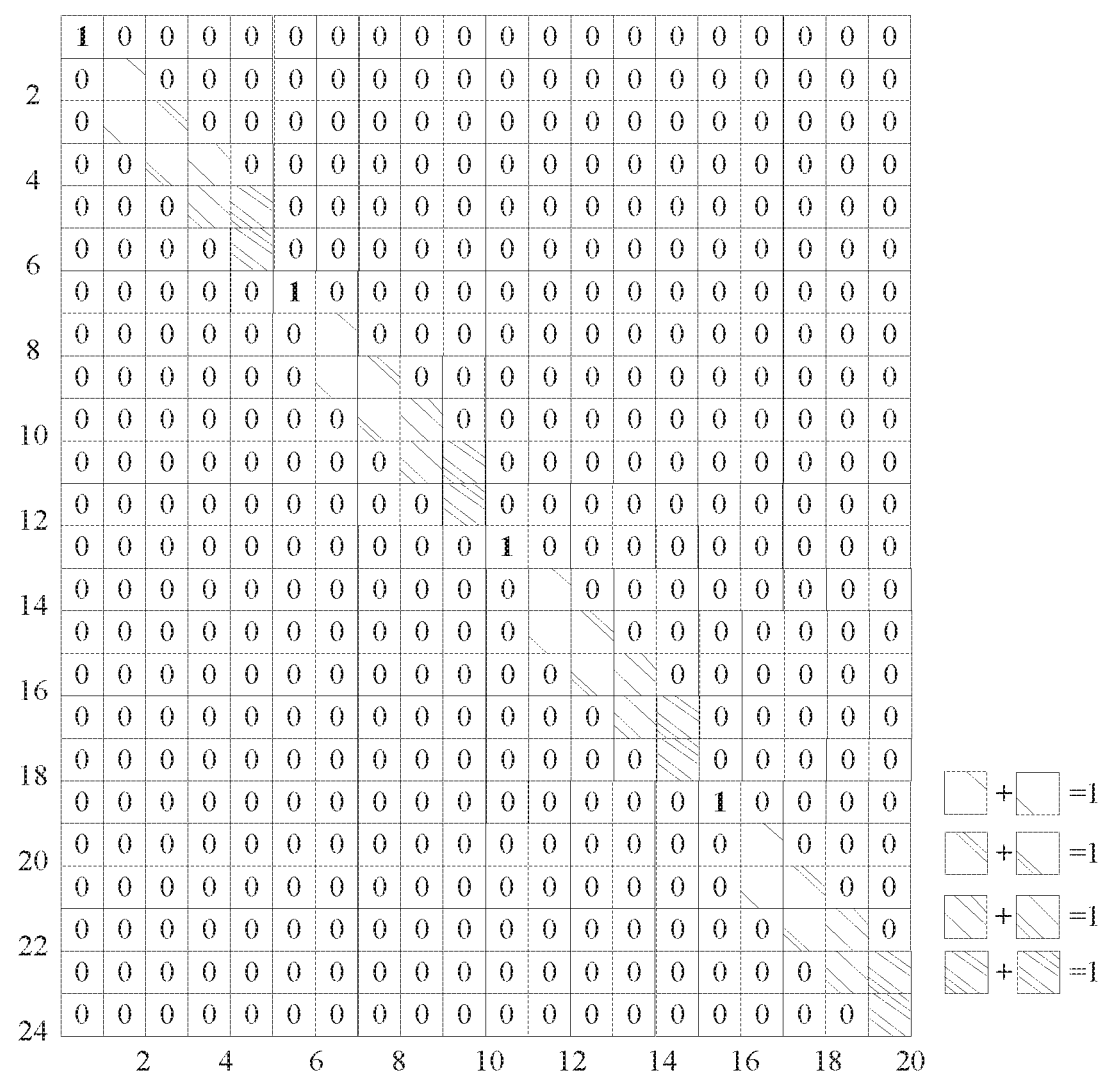

For a matrix corresponding to the interpolation operation related in this embodiment of the present disclosure, refer to FIG. 4. FIG. 4 shows a 24×20 interpolation matrix of which an interpolation ratio is (5,6), m=5, n=6, M=20, and N=24. As shown in FIG. 4, M pieces of data before interpolation are arranged into a 20×1 matrix, and a 24×1 matrix corresponding to N pieces of data is obtained by multiplying the 24×20 interpolation matrix by the 20×1 matrix corresponding to the M pieces of data.

In FIG. 4, in every five columns, one 1 exists in a corresponding column. On other columns, values exist only on both sides of a diagonal, and all matrix elements on other locations are 0. The matrix shown in FIG. 4 is circulated for four times on the diagonal based on a 5×6 matrix unit.

It can be learned from a matrix algorithm that six pieces of corresponding data are obtained by multiplying each element from a first row to a fifth row by the 20×1 matrix constituted by M data symbols. The six pieces of data relate to only the first five pieces of data of the M pieces of data. Circulation is deduced by analogy. If in the M pieces of data, a location for placing the first pilot symbol is always corresponding to an element 1 that is in the interpolation matrix, an amplitude of the pilot symbol keeps unchanged after interpolation.

It should be noted that, FIG. 4 shows only a possible form of the interpolation matrix, locations with values on both sides of the diagonal may not be limited to the case shown in FIG. 4, and data with values on both sides of the diagonal may further include another case.

It can be understood that a size of the matrix and a minimum circulation unit depend on the interpolation parameter (m, n), and values of M and N.

In addition, to ensure that power spectrum density after interpolation is normalized with that before interpolation, the M-length first signal sequence before interpolation may be multiplied by an amplification factor $$\sqrt{\frac{n}{m}}.$$

Step 305. Perform a first-phase rotation on the third signal sequence to obtain a second signal sequence.

Specifically, the first-phase rotation may be represented by multiplying the phase rotation factor $$e^{-j\frac{2\pi}{T}i(ZH+\frac{M}{2})},$$

and i=0, 1, . . . , N−1. A length of the third signal sequence is N, and a length of the second signal sequence is N. In other words, the second signal sequence includes N symbols.

It should be noted that the first-phase rotation is performed on a third signal sequence obtained after interpolation, to obtain the second signal sequence. The operation is embodied as a signal time shift in time domain, ZH is a quantity of symbols approximate to 0 that are at the head of the N pieces of data corresponding to time domain, and a quantity of symbols approximate to 0 that are at the tail is ZT=N−M−ZH. Both ZH and ZT are integers greater than or equal to 0, and at least one of ZH and ZT is a positive integer.

The interpolation operation may be intuitively understood as generating, based on the first signal sequence constituted by the M pieces of data, ZH+ZT pieces of data that are approximate to 0.

It should be noted that the first-phase rotation and the second-phase rotation are coordinately performed to achieve that an amplitude and a phase of a pilot symbol in a second signal sequence obtained after interpolation are the same as those of the second pilot symbol. Further, the receiving apparatus is capable of identifying the second pilot symbol that is generated by the transmit end based on the cell number, the frame number, and the like. Therefore, the first-phase rotation and the second-phase rotation enable the second pilot symbol to be transparent relative to the receiving apparatus.

FIG. 3 shows a generalized interpolation manner. When interpolation is performed in a specific manner such as the DFT interpolation or the spline interpolation, based on a specific requirement, the second pilot symbol may be transparent relative to the receiving apparatus by coordinately performing an operation, such as the first-phase rotation, the second-phase rotation, or phase rotation in another manner.

Step 306a. Map the second signal sequence onto a subcarrier to obtain a second signal sequence that is on the subcarrier.

Specifically, the second signal sequence that is corresponding to N symbols and that is obtained after the first-phase rotation is consecutively mapped onto N subcarriers in frequency domain.

Step 306b. Perform an inverse fast Fourier transform IFFT on the second signal sequence that is on the subcarrier, to obtain a time-domain signal.

Step 307. Perform a ZP or CP adding operation on a time-domain signal obtained after parallel-to-serial (P/S) conversion is finally performed. The ZP adding operation is adding $N_{ZP}$ 0s after the time-domain signal, the CP adding operation is duplicating the last $N_{cp}$ values of the time-domain signal to the head of the time-domain signal, and the CP adding operation needs to satisfy $$N_{cp} \le ZT \cdot \frac{FFTSize}{N}.$$

FFTSize is an FFT size.

The data transmission method shown in FIG. 2 may alternatively be implemented in another interpolation manner.

Figure 5:
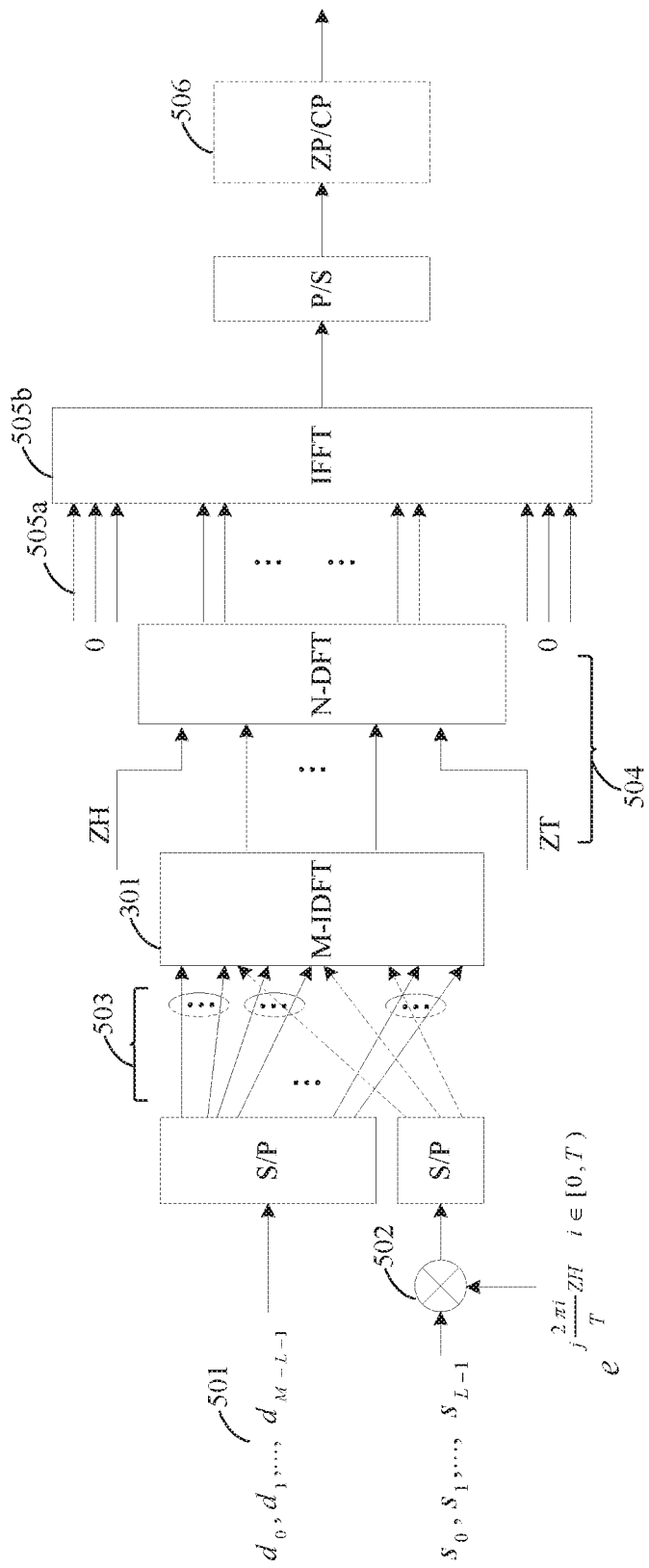
FIG. 5 shows a data transmission method and apparatus that are based on frequency-domain DFT interpolation according to an embodiment of the present disclosure.

A DFT fast algorithm is implemented by using a mature chip. Therefore, an embodiment of the present disclosure further provides a data transmission method and apparatus that are based on frequency-domain DFT interpolation. As shown in FIG. 5, steps 501 to 506 are included.

For the interpolation parameter and the quantity of symbols that need to be generated before the system allocates resources to the user and performs interpolation, refer to the description in FIG. 3.

It should be noted, for step 501, step 503, step 505a, step 505b, and step 506, reference may also be made to the description in step 301, step 303, step 306a, step 306b, and step 307, respectively. For brevity, details are not described in the following again.

Step 502. Generate at least one second pilot symbol based on a cell number, a frame number, and the like.

To ensure that the receive end can transparently receive a pilot symbol, and perform a third-phase rotation on the at least one second pilot symbol to obtain at least one first pilot symbol, specifically, the at least one second pilot symbol may be L(L≤T) pilot symbols, and the third-phase rotation may be represented by multiplying a phase rotation factor $$e^{\frac{j2\pi}{T}iZH}.$$

i∈[0, T), and i is determined depending on a candidate first pilot symbol location that is of a first signal sequence in step 503 and to which the first pilot symbol is specifically interpolated.

Step 504. Perform an inverse discrete Fourier transform IDFT on the first signal sequence to obtain a fourth signal sequence; add ZH 0s to the head of the fourth signal sequence, and add ZT 0s to the tail of the fourth signal sequence, to obtain a fifth signal sequence, where both ZH and ZT are integers greater than or equal to 0, and at least one of ZH and ZT is a positive integer; and perform a discrete Fourier transform DFT on the fifth signal sequence to obtain a second signal sequence, where a length of the second signal sequence equals a sum of a length of the first signal sequence, ZH, and ZT.

It can be understood that, when ZH equals 0 and ZT is greater than 0, it is equivalent to adding ZT 0s to the tail of the fourth signal sequence to obtain the fifth signal sequence; when ZH is greater than 0 and ZT equals 0, it is equivalent to adding ZH 0s to the head of the fourth signal sequence to obtain the fifth signal sequence; when both ZH and ZT are greater than 0, it is equivalent to adding ZH 0s to the head of the fourth signal sequence and adding ZT 0s to the tail of the fourth signal sequence, to obtain the fifth signal sequence.

To ensure that power spectrum density after interpolation is normalized, the M-length first signal sequence is multiplied by an amplification factor $$\sqrt{\frac{n}{m}}$$

before interpolation.

Specifically, the fourth signal sequence is a time-domain sequence obtained in time domain after an M-point IDFT. Then, ZH 0s are added to the head of the M-point time-domain sequence and ZT 0s are added to the tail of the M-point time-domain sequence, to extend a length of the M-point time-domain sequence to N, so as to obtain the fifth signal sequence. Finally, an N-point DFT is performed on the fifth signal sequence to transform the fifth signal sequence back to a frequency-domain sequence, to obtain the second signal sequence.

It can be understood that, when L equals 0, the first signal sequence includes only a data symbol; when L equals M, the first signal sequence includes only a first pilot symbol; when L is greater than 0 and less than M, the first signal sequence includes at least one data symbol and at least one first pilot symbol. In the accompanying drawings and this embodiment of the present disclosure, only an example in which the first signal sequence includes at least one data symbol and at least one first pilot symbol is used for description. However, the method and processing process of this embodiment of the present disclosure are also applicable to scenarios in which the first signal sequence includes only a first pilot symbol and the first signal sequence includes only a data symbol.

According to the data transmission method provided in this embodiment of the present disclosure, interpolation performed in frequency domain is equivalent to an effect of adding a 0 to both ends of a signal in time domain. In other words, interpolation in one transform domain is performed, and an effect of adding a 0 to a signal is obtained in another transform domain. The data transmission method provided in this embodiment of the present disclosure is applicable to an OFDM system. In addition, with reference to the interpolation manner and the channel delay deviation resisting solution in the present application, the data transmission method provided in this embodiment of the present disclosure is further applicable to another system. A person skilled in the art may understand that all other equivalent solutions similar to this embodiment of the present disclosure shall fall within the protection scope of the embodiments of the present disclosure.

The data transmission method provided in this embodiment of the present disclosure may also be referred to as a method for generating an adaptive ZT waveform based on the OFDM system. According to this embodiment of the present disclosure, based on the obtained maximum channel delay deviation, the transmit end performs, on a modulated symbol that is mapped onto frequency domain, a fractional multiple interpolation filtering operation of a particular ratio, to achieve an effect that ZH pieces of data at the head of a time-domain signal sequence and ZT pieces of data at the tail of the time-domain signal sequence are approximate to 0 power, so that an objective of reducing ISI is achieved.

Correspondingly, an amplitude of a value on an integer multiple interpolation location may keep unchanged after interpolation; therefore, the beneficial effects of the embodiments of the present disclosure may also be achieved in another equivalent manner at the transmit end.

Figure 6:
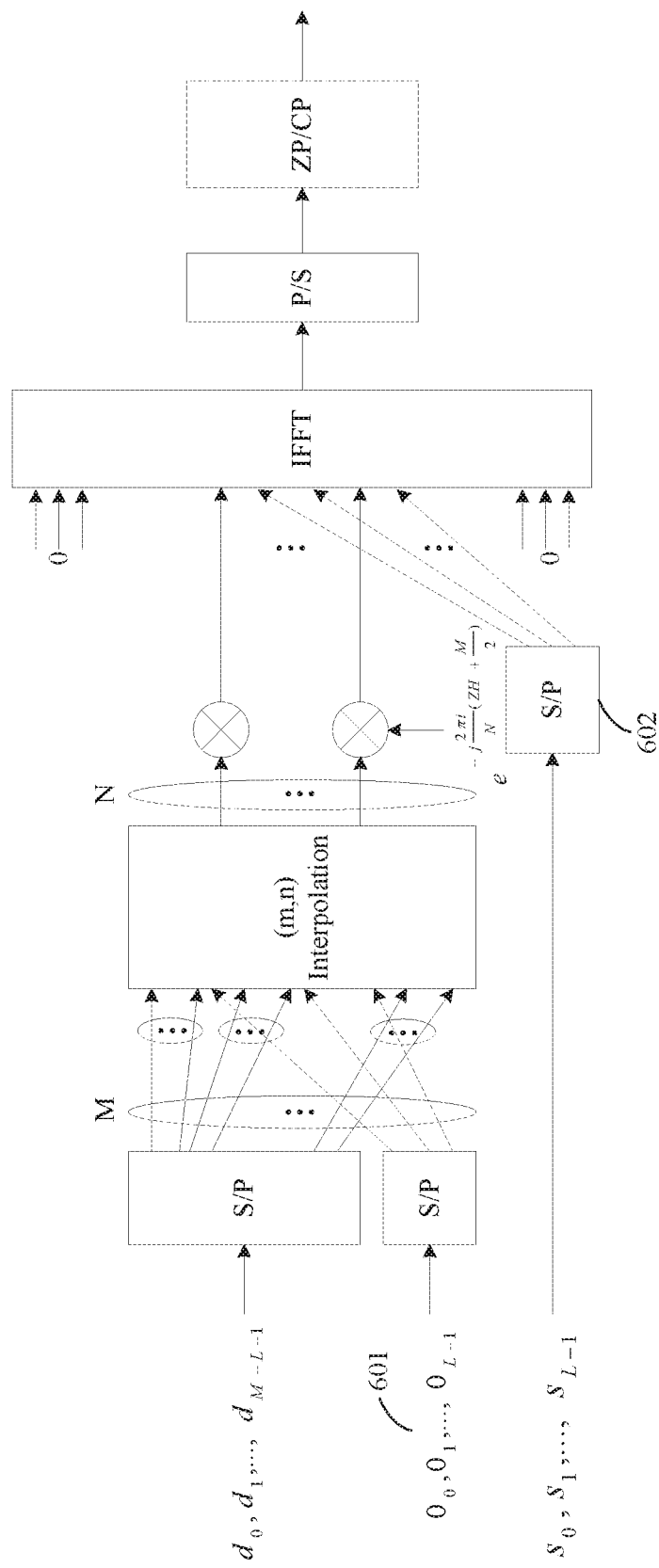
FIG. 6 shows an equivalent data transmission method and apparatus that are based on generalized frequency-domain interpolation according to an embodiment of the present disclosure.
Figure 7:
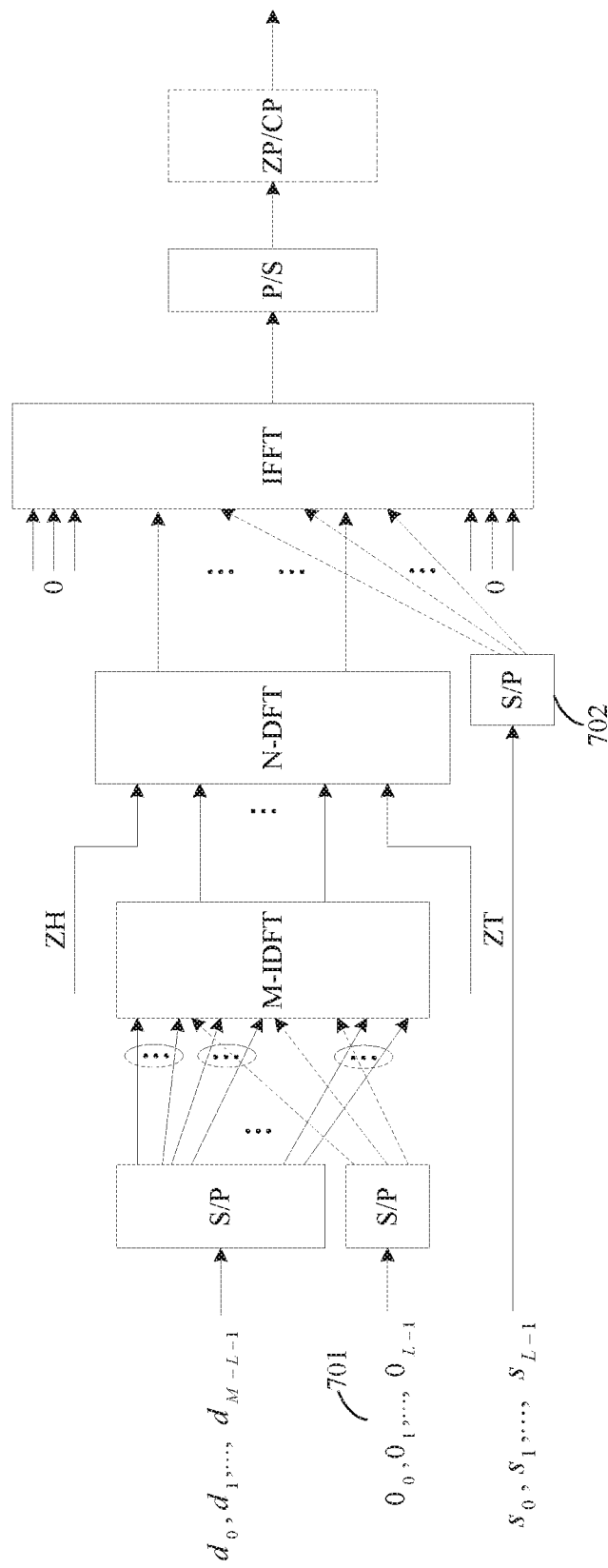
FIG. 7 shows an equivalent data transmission method and apparatus that are based on frequency-domain DFT interpolation according to an embodiment of the present disclosure.

By using FIG. 6 and FIG. 7 as examples, the following describes two other specific equivalent examples of the interpolation operation provided in the embodiments of the present disclosure.

FIG. 6 shows an equivalent data transmission method and apparatus that are based on generalized frequency-domain interpolation according to an embodiment of the present disclosure.

In a possible design, the first signal sequence includes at least one 0 and at least one data symbol, the at least one 0 and the at least one data symbol constitute the first signal sequence according to a second predefined rule, and the second predefined rule is as follows: in the first signal sequence, at intervals of a first predefined quantity of data symbols, there is a candidate location for interpolating a 0, and at least one candidate location for interpolating a 0 is selected to interpolate the 0, where the first predefined quantity is determined based on the interpolation parameter. In this embodiment, the first predefined quantity may be equal to m−1.

Step 601. Interpolate, before interpolation, a 0 to an $(i*m)^{th}$ location to which a pilot symbol should have been interpolated. In this way, after interpolation, a value on a corresponding $(i*n)^{th}$ integer multiple interpolation location is also 0.

Further, the mapping at least one group of second signal sequences onto the subcarrier to obtain at least one group of second signal sequences that are on the subcarrier further includes: at intervals of a second predefined quantity of subcarriers, there is a candidate second pilot symbol location, using the second pilot symbol to replace a symbol that is of the second signal sequence and that is on a subcarrier on which at least one candidate second pilot symbol location resides, where the second predefined quantity is determined based on the interpolation parameter, the second predefined quantity is greater than the first predefined quantity, in the second signal sequence, a location replaced by the second pilot symbol is related to a location to which the 0 is interpolated in the first signal sequence, and the second pilot symbol is used by the receive end to perform at least one of channel measurement and channel estimation. In this embodiment, the second predefined quantity may be equal to n−1.

Step 602. Directly interpolate the second pilot symbol to the $(i*n)^{th}$ location after interpolation.

In addition, for other steps that are not shown in FIG. 6, refer to the description in FIG. 3. Details are not described herein.

Correspondingly, FIG. 7 shows an equivalent data transmission method and apparatus that are based on frequency-domain DFT interpolation according to an embodiment of the present disclosure. For step 701 and step 702, refer to the detailed description in step 601 and step 602. In addition, for other steps that are not shown in FIG. 7, refer to the description in FIG. 5. Details are not described herein.

Further, an interpolation algorithm shown in FIG. 5 or FIG. 7 is based on DFT interpolation; therefore, for ease of using a mature DFT chip, the interpolation parameter (m, n) needs to be ensured to satisfy a radix-2, a radix-3, and/or a radix-5 requirement. In other words, both the parameters m and n are multiples of 2, 3, and/or 5. In addition, a ratio $$\frac{n}{m}$$

is defined as follows: A larger ratio indicates a higher interpolation ratio, a longer corresponding ZT, and a stronger anti-asynchronization capability. On the contrary, a smaller ratio indicates a lower interpolation ratio, a shorter corresponding ZT, and a weaker anti-asynchronization capability, but more valid transmitted data. Therefore, quantization may be performed in an asynchronous range. To satisfy the foregoing two requirements, Table 1 is a multicarrier OFDM interpolation parameter configuration table based on frequency-domain DFT interpolation and shows a possible interpolation parameter combination. The table is corresponding to a scenario in which a normal ZP/CP is further added to a time-domain signal after frequency-domain interpolation. It can be understood that, according to a same method, an interpolation parameter of a scenario in which no ZP/CP is added to a time-domain signal may be deduced. Details are not described herein.

TABLE 1

Multicarrier OHM interpolation parameter configuration table based on frequency-domain DFT interpolation

| Interpolation parameter (m, n) | Overheads | Maximum resisting delay deviation | Subcarrier spacing for integer multiple interpolation | Indication message |
|---|---|---|---|---|
| No interpolation | 7% | 4.7 μs | 1 | 000 |
| Interpolation (15, 16) | 12.5% | 8.9 μs | 16 | 001 |
| Interpolation (8, 9) | 17% | 12.1 μs | 9 | 010 |
| Interpolation (5, 6) | 22% | 15.7 μs | 6 | 011 |
| Interpolation (3, 4) | 30% | 21.7 μs | 4 | 100 |
| Interpolation (2, 3) | 38% | 26.7 μs | 3 | 101 |
| Interpolation (1, 2) | 53% | 37.7 μs | 2 | 110 |

The overheads and maximum delay are divided into 14 OFDM symbols based on 1 ms, and a ZP/CP of each symbol is about 4.7 μs. A calculation formula of the overheads Overhead Ratio is as follows:

$$\text{Overhead Ratio} = \frac{1 + 14 \cdot \frac{n-m}{n}}{15}$$

A calculation formula of the maximum resisting delay deviation MaxDelay Deviation is as follows:

$$\text{MaxDelay Deviation} = \frac{1000}{15 \times 14} + \frac{100}{15} \cdot \frac{n-m}{n} (\mu s)$$

It should be noted that the data transmission method provided in this embodiment of the present disclosure further includes: sending information related to the interpolation parameter, where the information related to the interpolation parameter is used by the receive end to determine the interpolation parameter.

Specifically, indication information of the interpolation parameter may be sent to the receive end by using a control channel or a data channel. As shown in Table 1, the indication information may be represented by three bits. In addition, the indication information of the interpolation parameter may not be sent, and the receive end identifies the interpolation parameter by performing blind detection based on a difference between pilot patterns corresponding to different interpolation configurations.

Correspondingly, in this embodiment of the present disclosure, performance of the adaptive ZT-OFDM solution is compared with that of conventional normal CP/extended CP adaptive switching. A normal CP cannot work if a delay deviation exceeds 4 μs, and an extended CP cannot work if a delay deviation exceeds 16 μs. The adaptive ZT-OFDM solution provided in this embodiment of the present disclosure may work within a delay deviation range of 0 μs to 24 μs, and a working point in this embodiment of the present disclosure can vary steadily by configuring a proper interpolation parameter for a different delay deviation. In addition, the working point in this embodiment of the present disclosure is better than an extended CP working point in a delay deviation range of 0 μs to 12 μs. Compared with the extended CP working point, the working point in the adaptive ZT-OFDM solution provided in this embodiment of the present disclosure has a lower signal-to-noise ratio (SNR). Different optimal interpolation parameters are corresponding to different delay deviations, and therefore the working point in the adaptive ZT-OFDM solution can support a longer range than that of the extended CP. In addition, a delay granularity is divided in a finer manner by using different interpolation parameters; therefore, the working point in the adaptive ZT-OFDM solution varies more smoothly compared with a working point in conventional adaptive switching.

In the foregoing solutions in FIG. 3, FIG. 5, FIG. 6, and FIG. 7, to keep an interpolation feature, resources of a target user need to be consecutive in frequency domain to ensure a ZT effect in time domain. An embodiment of the present disclosure further provides a block interpolation manner, to obtain a flexible scheduling effect to some extent.

Preferably, the mapping the second signal sequence onto a subcarrier to obtain a second signal sequence that is on the subcarrier may specifically include: mapping at least one group of second signal sequences onto the subcarrier to obtain at least one group of second signal sequences that are on the subcarrier.

It is assumed that signal sequences before interpolation include an M0 signal sequence, an M1 signal sequence, . . . , and an Mk signal sequence. The foregoing interpolation operation based on the interpolation parameter (m, n) may be performed on the M0 signal sequence, the M1 signal sequence, . . . , and the Mk signal sequence, to obtain an N0 signal sequence, an N1 signal sequence, . . . , and an Nk signal sequence, respectively. The at least one group of second signal sequences may include one or more of the N0 signal sequence, the N1 signal sequence, . . . , and the Nk signal sequence.

Any one or more manners in the solutions shown in FIG. 3, FIG. 5, FIG. 6, and FIG. 7 may be used as a specific manner of performing interpolation on each signal sequence. Details are not described herein.

Figure 8:
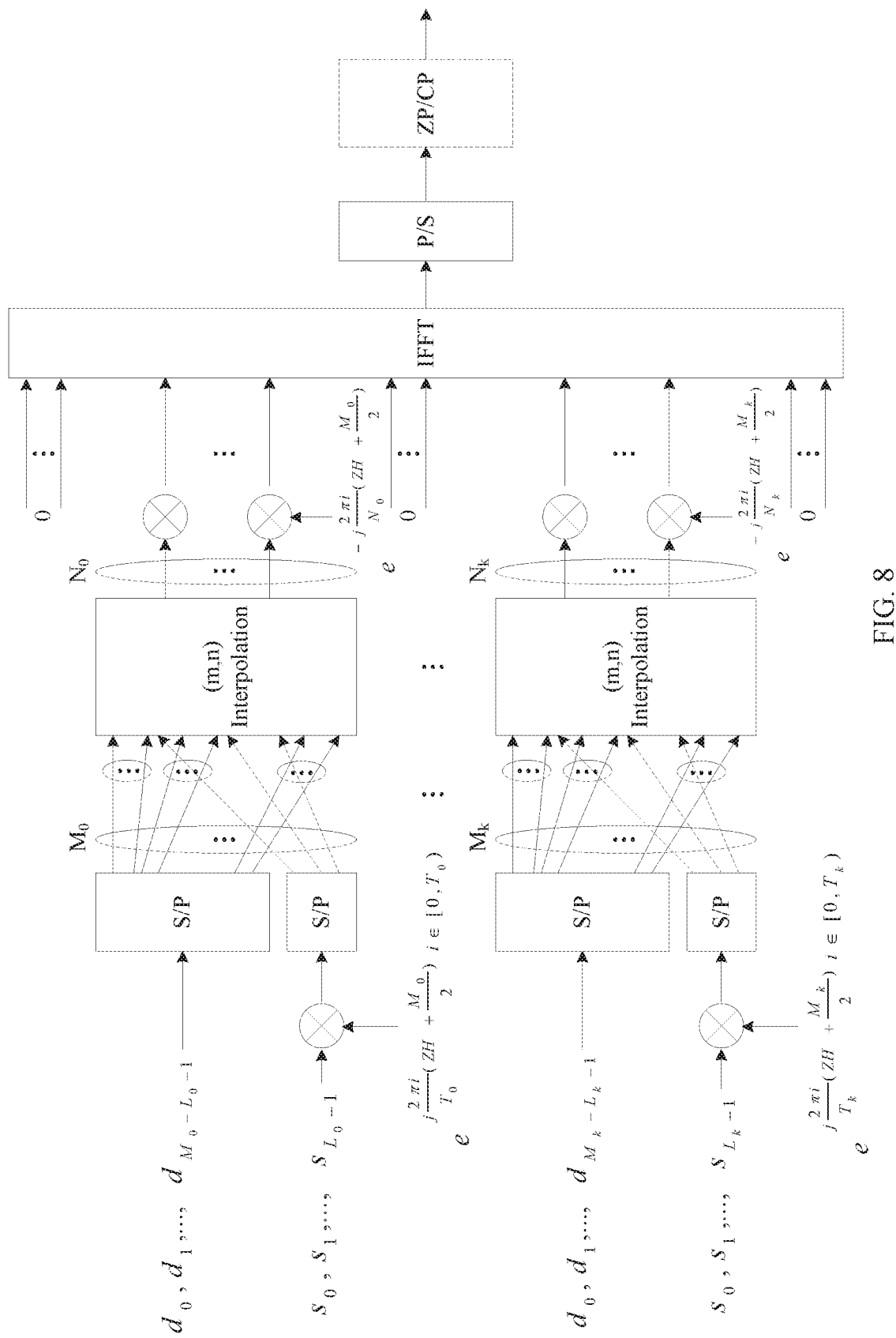
FIG. 8 shows a data transmission method and apparatus that are based on generalized frequency-domain block interpolation according to an embodiment of the present disclosure.

By using FIG. 8 as an example, the following describes another specific example of the interpolation operation provided in the embodiments of the present disclosure. FIG. 8 shows a data transmission method and apparatus that are based on generalized frequency-domain block interpolation according to an embodiment of the present disclosure.

FIG. 8 shows only implementation of a manner based on generalized frequency-domain interpolation, and a difference between block interpolation and interpolation that is not performed in a block manner is as follows: modulated symbols of a user are divided into K groups, pilot symbols are also divided into K groups correspondingly, and an amount of data in each group may be different and is determined by a scheduler. Subsequently, each group of data symbols and each group of pilot symbols are implemented exactly in the manners shown in FIG. 3, FIG. 5, FIG. 6, and FIG. 7. Data symbols after interpolation are independently mapped onto frequency-domain subcarriers based on resources allocated by the scheduler. Each group of subcarriers are consecutive, but different groups of subcarriers may be inconsecutive.

According to this embodiment of the present disclosure, the block interpolation manner allows resource blocks of one user to be discretely distributed in transmission bandwidth. In this way, the target user can obtain a better frequency-domain diversity effect, and scheduling for another user can also be supported more flexibly.

It can be understood that block interpolation may also be combined with another interpolation solution, for example, there may be a block interpolation solution based on frequency-domain DFT interpolation. Details are not described herein.

By configuring a plurality of different interpolation parameters, the solution provided in this embodiment of the present disclosure has more choices than the existing normal CP/extended CP solution. Corresponding to different optimal interpolation parameters that are corresponding to different delay deviations, the solution provided in this embodiment of the present disclosure can support a longer delay deviation range than the extended CP solution. Compared with a ZT-s-OFDM solution, the solution provided in this embodiment of the present disclosure has an advantage of interpolating pilots at intervals in frequency domain, and therefore can more flexibly support multi-antenna port multiplexing in MIMO transmission.

It should be noted that, compared with a single-carrier S-OFDM system, a multicarrier OFDM system has an advantage of flexible scheduling. To be specific, resources of one user may be discretely distributed in transmission bandwidth. In this way, the target user can obtain a better frequency-domain diversity effect, and scheduling for another user can also be supported more flexibly.

In addition, according to the solution provided in this embodiment of the present disclosure, interpolation parameters corresponding to different delay deviations can be adaptively configured, so that data transmission efficiency and a throughput are improved. Further, according to this embodiment of the present disclosure, pilots may be interpolated at intervals in frequency domain; therefore, multi-antenna port multiplexing in MIMO transmission can be supported more flexibly.

Figure 9:
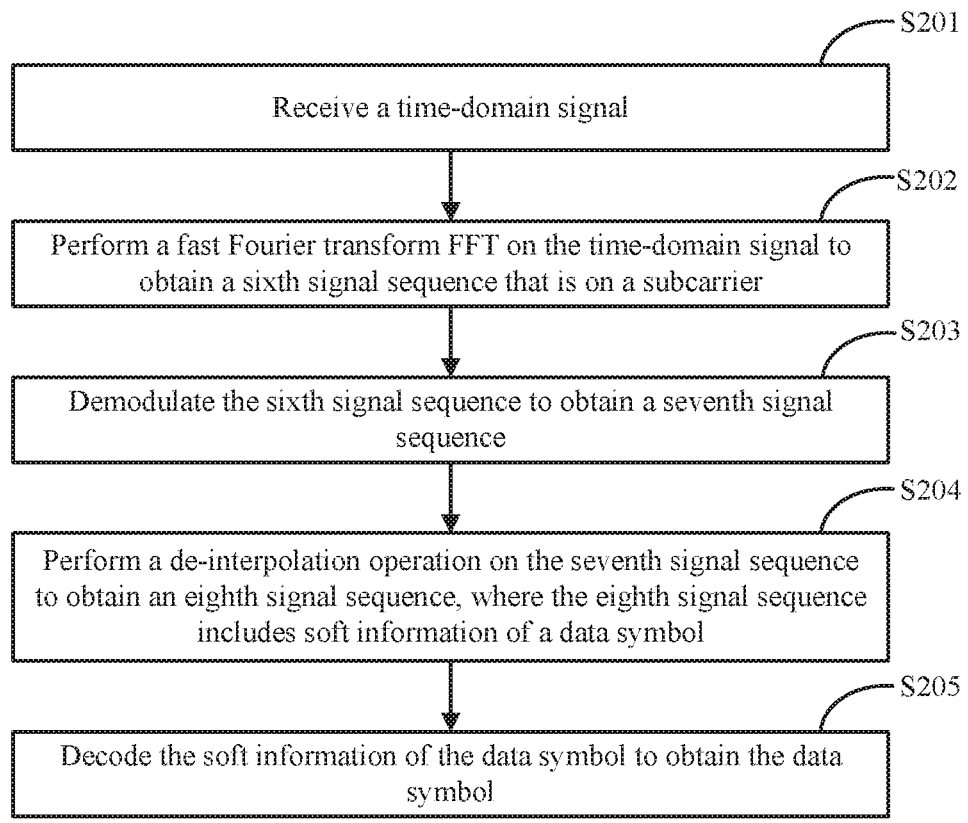
FIG. 9 is a flowchart of another data transmission method according to an embodiment of the present disclosure.

It should be noted that, in the embodiments of the present disclosure, the receiving apparatus needs to convert a received time-domain signal to a frequency-domain signal, and perform operations such as frequency-domain de-interpolation, to obtain user data. With reference to FIG. 9, the following details the solution provided in the embodiments of the present disclosure. FIG. 9 is a flowchart of another data transmission method according to an embodiment of the present disclosure. This embodiment includes the following steps.

Step S201. A receiving apparatus receives a time-domain signal.

Preferably, the method further includes: receiving information related to an interpolation parameter. The information related to the interpolation parameter is used to determine the interpolation parameter used for a de-interpolation operation.

Step S202. Perform a fast Fourier transform FFT on the time-domain signal to obtain a sixth signal sequence that is on a subcarrier.

Step S203. Demodulate the sixth signal sequence to obtain a seventh signal sequence.

Preferably, before the demodulating the sixth signal sequence, the method further includes: obtaining a pilot symbol; and performing channel estimation based on the pilot symbol, to obtain channel-related information.

Specifically, the channel-related information may include information such as a channel factor and interference noise.

It should be noted that the received time-domain signal is a signal obtained after channel weighting and interference noise superimposing are performed on a transmitted signal. Assuming that R is a received signal, h is the channel factor, S is a to-be-sent signal, and n is the interference noise, R=h*S+n. For ease of differentiation, it may be assumed that a pilot symbol in the to-be-sent signal S is Sp, and a data symbol in the to-be-sent signal S is $S_d$.

Specifically, the sixth signal sequence includes a received signal $R_d$ of the data symbol $S_d$ and a received signal Rp of the pilot symbol Sp.

It should be noted that the receive end and a transmit end may agree, in advance by using a control message, on information such as a pilot sequence Sp and a pilot pattern location that are used for transceiving. A received signal of a pilot symbol finally received by the receive end is Rp=h*Sp+n.

Further, the receive end estimates, based on the pilot symbol Sp and the received signal Rp of the pilot symbol, the channel-related information: the channel factor $\hat{h}$ and an interference noise matrix $\tilde{n}$.

Preferably, the demodulating the sixth signal sequence to obtain a seventh signal sequence includes: demodulating the sixth signal sequence based on the channel-related information, to obtain the seventh signal sequence.

Specifically, after the channel factor $\hat{h}$ and the interference noise matrix $\tilde{n}$ are estimated by using the pilot symbol Sp and the received signal Rp of the pilot symbol, a corresponding data symbol $\widetilde{S_d}$ may be obtained through demodulation by using $R_d$, $\hat{h}$, and $\tilde{n}$.

It should be noted that, $\hat{h}$ and $\tilde{n}$ are estimates, and therefore the data symbol $\widetilde{S_d}$ obtained through demodulation based on $\hat{h}$ and $\tilde{n}$ is also an estimate. There may be an error between the estimate and a true value of $S_d$; therefore, the foregoing information obtained through demodulation is referred to as soft information. In other words, the data symbol $\widetilde{S_d}$ obtained through demodulation is soft information corresponding to the data symbol transmitted by the transmit end.

It can be understood that the seventh signal sequence obtained through demodulation includes the soft information $\widetilde{S_d}$ of the data symbol.

It should be noted that the receiving apparatus further performs channel measurement based on the channel factor $\hat{h}$ and the interference noise matrix $\tilde{n}$, and feeds back channel quality information and channel delay-related information to the transmitting apparatus. This is not specifically described in this embodiment of the present disclosure.

Step S204. Perform a de-interpolation operation on the seventh signal sequence to obtain an eighth signal sequence, where the eighth signal sequence includes soft information of a data symbol, and a length of the eighth signal sequence is less than a length of the seventh signal sequence.

Preferably, before the performing a de-interpolation operation on the seventh signal sequence, the method further includes: determining the interpolation parameter; and the performing a de-interpolation operation on the seventh signal sequence to obtain an eighth signal sequence includes: performing the de-interpolation operation on the seventh signal sequence based on the interpolation parameter, to obtain the eighth signal sequence.

The de-interpolation operation includes one or more of the following: DFT de-interpolation, spline de-interpolation, first-order de-interpolation, and high-order de-interpolation.

It can be understood that the seventh signal sequence is corresponding to soft information of a second signal sequence of the transmitting apparatus, and the eighth signal sequence is corresponding to soft information of a first signal sequence of the transmitting apparatus. The seventh signal sequence includes the soft information of the data symbol. After the de-interpolation operation, the eighth signal sequence includes corresponding soft information of a data symbol obtained after de-interpolation.

Further, the soft information of the data symbol in the eighth signal sequence is extracted for further processing.

Step S205. Decode the soft information of the data symbol to obtain the data symbol.

Specifically, a pilot symbol is removed from the eighth signal sequence, and soft information and channel-related information of all data symbols other than the pilot symbol are extracted to perform an operation such as decoding, to obtain the data symbols. The data symbols are corresponding to user data.

Figure 10:
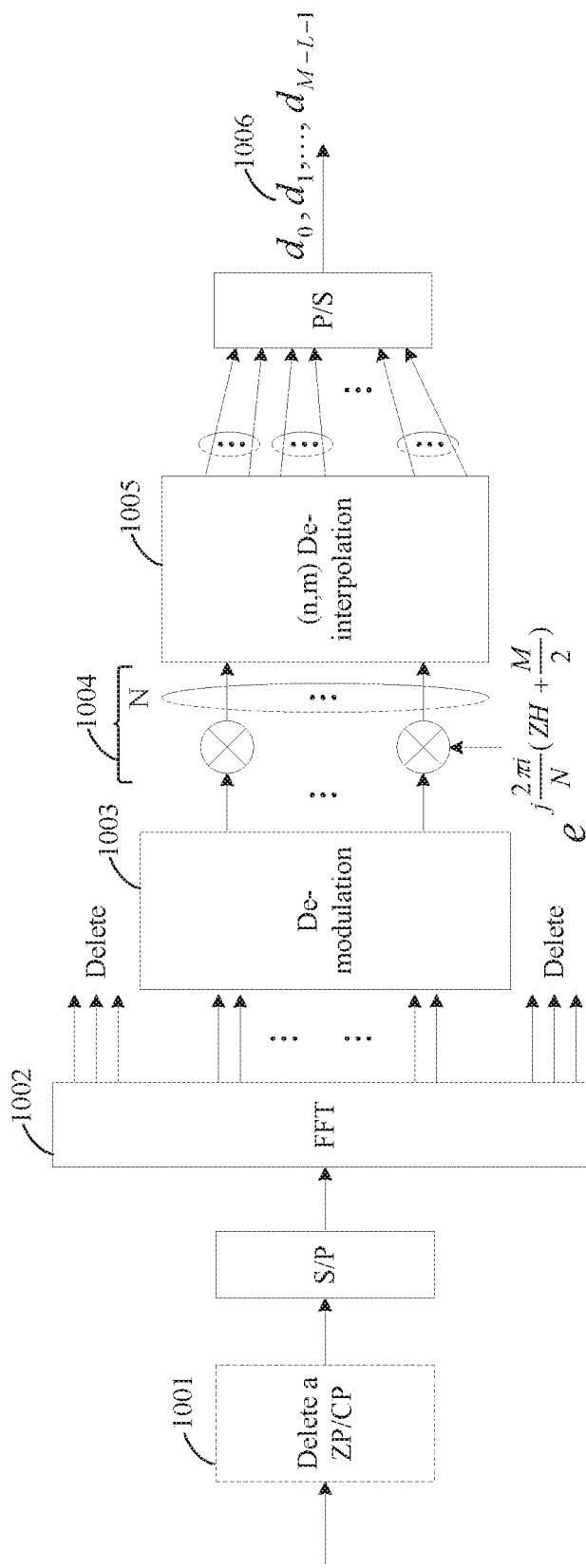
FIG. 10 shows a data transmission method and apparatus that are based on generalized frequency-domain interpolation according to an embodiment of the present disclosure.

By using FIG. 10 as an example, the following describes a specific example of the de-interpolation operation provided in the embodiments of the present disclosure.

FIG. 10 shows a data transmission method and apparatus that are based on generalized frequency-domain interpolation according to an embodiment of the present disclosure. As shown in FIG. 10, this embodiment mainly includes the following steps.

Step 1001. Receive a time-domain signal.

Further, a ZP or CP removing operation is performed on the received time-domain signal.

For ZP removing, a simplest Overlap and Add OLA (Overlap and Add) manner may be used. To be specific, the last $N_{zp}$ symbols of a time-domain signal are moved back onto the first $N_{zp}$ pieces of data of the time-domain signal, to form an automatic circulation feature of the time-domain signal in FFTSize. For CP removing, the first $N_{zp}$ pieces of data are directly deleted.

Step 1002. Perform a fast Fourier transform FFT on the time-domain signal to obtain a sixth signal sequence that is on a subcarrier.

Specifically, before the FFT is performed on a time-domain signal obtained after ZP or CP removing is performed, S/P conversion is first performed on the time-domain signal obtained after ZP or CP removing is performed.

Step 1003. Demodulate the sixth signal sequence to obtain a seventh signal sequence.

Specifically, signals on all N subcarriers of the user are extracted. A pilot symbol is placed on an integer multiple interpolation location and a value keeps unchanged; therefore, a receiving apparatus may perform, based on a pilot location, a measurement operation such as frequency-domain channel estimation, noise estimation, or interference noise covariance matrix estimation in a conventional manner such as the manner shown in step S203, and perform a decoding operation by using information related to an estimated frequency-domain channel, to obtain the seventh signal sequence corresponding to the frequency-domain sixth signal sequence. The seventh signal sequence is decoded soft information of the N subcarriers:

$$\begin{bmatrix} s(0) \\ s(1) \\ \vdots \\ s(N-1) \end{bmatrix} =$$

$$\begin{bmatrix} \omega^H(0)r(0) \\ \omega^H(1)r(1) \\ \vdots \\ \omega^H(N-1)r(N-1) \end{bmatrix} = \begin{bmatrix} q(0)s(0) \\ q(1)s(1) \\ \vdots \\ q(N-1)s(N-1) \end{bmatrix} + \begin{bmatrix} \omega^H(0)n(0) \\ \omega^H(1)n(1) \\ \vdots \\ \omega^H(N-1)n(N-1) \end{bmatrix}$$

A demodulation coefficient is as follows:

$$\omega^H(i) = \frac{h^H(i)Ruu^{-1}}{1 + h^H(i)Ruu^{-1}h(i)}$$

An equivalent channel factor after demodulation is as follows:

$$q(i) = \omega^H(i)h(i)$$

s(i) represents a data symbol, r(i) represents a received signal of the data symbol, q(i) represents the equivalent channel factor, n(i) represents interference noise, $h^H(i)$ represents a channel factor, $Ruu^{-1}$ represents an interference noise matrix, and i=0, 1, ..., N−1.

Step 1004. Perform a first-phase de-rotation on the seventh signal sequence to obtain a ninth signal sequence.

Specifically, the first-phase de-rotation operation that is opposite to a first-phase rotation operation performed by a transmit end is performed on the seventh signal sequence. Soft information of each subcarrier in the seventh signal sequence is multiplied by a phase rotation factor $$e^{\frac{j2\pi}{N}i\left(ZH+\frac{M}{2}\right)},$$

to obtain the ninth signal sequence, where i=0, 1, ..., N−1. The ninth signal sequence is soft information of N subcarriers obtained after the first-phase de-rotation.

It should be noted that, the equivalent channel factor is a real value representing an amplitude, and therefore the equivalent channel factor does not need the first-phase de-rotation.

FIG. 10 shows a generalized de-interpolation manner. When another de-interpolation manner is used, another phase de-rotation may be performed accordingly, or another de-interpolation operation is directly performed without performing a phase de-rotation.

It can be understood that the receiving apparatus may select, based on a related indication transmitted by the transmitting apparatus, a specific de-interpolation manner corresponding to an interpolation manner of the transmitting apparatus. In addition, the transmitting apparatus and the receive end may agree in advance on using a fixed interpolation manner and a corresponding de-interpolation manner to process data.

Step 1005. Perform a de-interpolation operation on the ninth signal sequence to obtain an eighth signal sequence.

An (n, m) de-interpolation operation that is opposite to an interpolation operation performed by the transmit end is performed on the ninth signal sequence.

Assuming that an interpolation matrix of the transmit end is $A_{N \times M}$ and a de-interpolation matrix of the receive end is $A^H$, there is an original eighth signal sequence after de-interpolation. The original eighth signal sequence is soft information α(i) of a QAM symbol:

$$\begin{bmatrix} \alpha(0) \\ \alpha(1) \\ \vdots \\ \alpha(M-1) \end{bmatrix} = A^H \begin{bmatrix} s(0) \\ s(1) \\ \vdots \\ s(N-1) \end{bmatrix}$$

The (n, m) de-interpolation operation is performed on N equivalent channel factors ρ(i) that are obtained after equalization, to obtain the following sequence:

$$\begin{bmatrix} \rho(0) \\ \rho(1) \\ \vdots \\ \rho(M-1) \end{bmatrix} = A^H \begin{bmatrix} q(0) \\ q(1) \\ \vdots \\ q(N-1) \end{bmatrix}$$

i=0, 1, ..., M−1.

In addition, there is a channel compensation factor:

$$\delta(j) = \frac{1}{\sigma\sqrt{\frac{N}{M} - \rho(j)}}$$

σ is a regulatory factor.

The channel compensation factor is multiplied by each original eighth signal sequence and each equivalent channel factor that is obtained after de-interpolation, to obtain a normalized eighth signal sequence and an equivalent channel factor ρ'(j). The eighth signal sequence is normalized soft information α'(j) of the QAM symbol:

$$\alpha'(j)=\delta(j)\alpha(j)$$

$$\rho'(j)=\delta(j)\rho(j)$$

j=0, 1, ..., M−1.

Specifically, the eighth signal sequence includes soft information of the data symbol, and a length of the eighth signal sequence is less than a length of the seventh signal sequence.

Specifically, the soft information of the data symbol in the eighth signal sequence is extracted for further processing.

Step 1006. Decode soft information of a data symbol to obtain the data symbol.

Specifically, a pilot symbol is removed from the eighth signal sequence, and soft information of all data symbols other than the pilot symbol and the equivalent channel factor are extracted, P/S conversion is performed on the soft information and the equivalent channel factor, and then subsequent operations, such as QAM demodulation, descrambling, rate de-matching, and channel decoding, are performed on the soft information and the equivalent channel factor, to obtain the data symbols.

It should be noted that the signal processing process, of the receiving apparatus, based on the generalized interpolation manner shown in FIG. 10 is corresponding to the signal processing process of the transmitting apparatus shown in FIG. 3.

The data transmission method shown in FIG. 9 may alternatively be implemented in another de-interpolation manner. By using FIG. 11 as an example, the following describes another specific example of the interpolation operation provided in the embodiments of the present disclosure.

Figure 11:
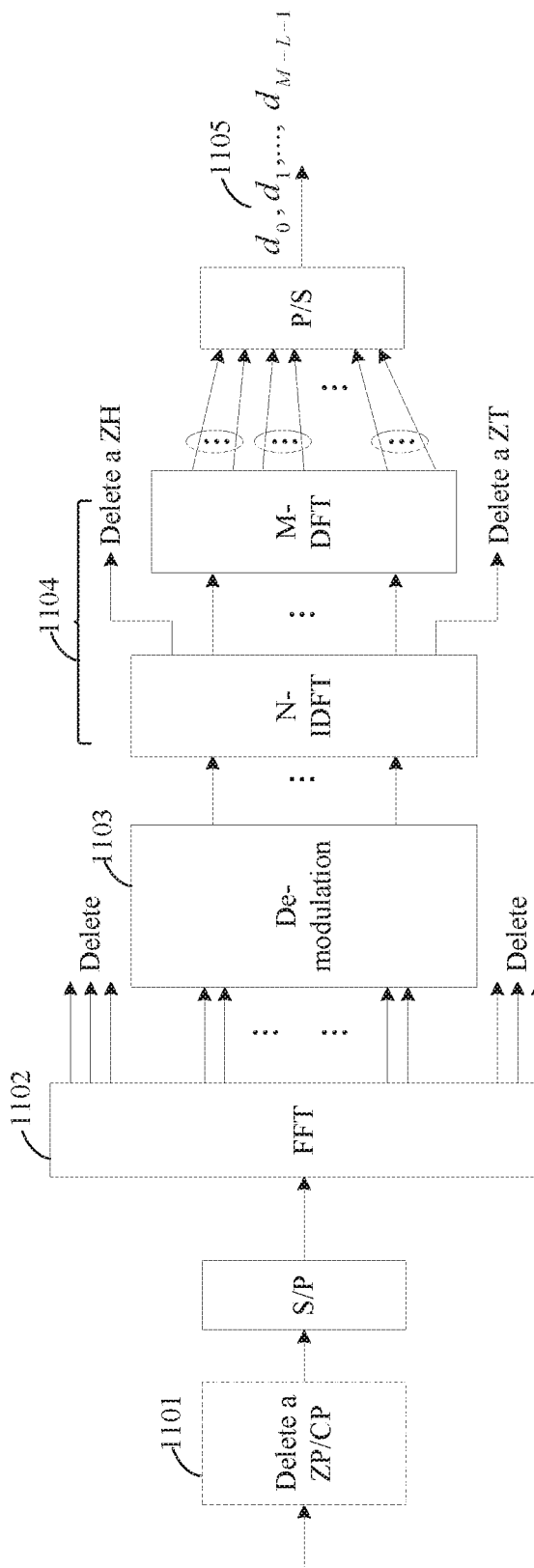
FIG. 11 shows a data transmission method and apparatus that are based on frequency-domain DFT interpolation according to an embodiment of the present disclosure.

FIG. 11 shows a data transmission method and apparatus that are based on frequency-domain DFT interpolation according to an embodiment of the present disclosure. As shown in FIG. 11, steps 1101 to 1106 are mainly included.

It should be noted that, for step 1101, step 1102, step 1103, and step 1105, reference may be made to step 1001, step 1002, step 1003, and step 1006, respectively.

The following mainly describes a DFT de-interpolation operation in step 1104.

Step 1104. Perform an inverse discrete Fourier transform IDFT on the seventh signal sequence to obtain a tenth signal sequence; delete ZH 0s from the head of the tenth signal sequence, and delete ZT 0s from the tail of the tenth signal sequence, to obtain an eleventh signal sequence; and perform a discrete Fourier transform DFT on the eleventh signal sequence to obtain the eighth signal sequence, where the length of the eighth signal sequence equals a value obtained by subtracting ZH and ZT from the length of the seventh signal sequence.

Specifically, a (n, m) DFT de-interpolation operation that is opposite to an interpolation operation performed by the transmit end is performed on the seventh signal sequence to obtain the eighth signal sequence.

First, the seventh signal sequence is transformed to time domain through an N-point IDFT, to obtain the tenth signal sequence; then, ZH values at the head of the tenth signal sequence and ZT values at the tail of the tenth signal sequence that are corresponding to those in the transmit end are deleted, to obtain the M-length eleventh signal sequence; finally, the eleventh signal sequence is transformed back to frequency domain through an M-point DFT, to obtain an original eighth signal sequence. The original eighth signal sequence is soft information $\alpha(i)$ of the QAM symbol:

$$\begin{bmatrix} \alpha(0) \\ \alpha(1) \\ \vdots \\ \alpha(M-1) \end{bmatrix} = F_M [0_{ZH \times M} \ I_{M \times M} \ 0_{ZT \times M}] F_N^H \begin{bmatrix} s(0) \\ s(1) \\ \vdots \\ s(N-1) \end{bmatrix}$$

i=0, 1, . . . , M−1. $F_M$ represents the M-point DFT, $F_N^H$ represents the N-point IDFT, and $[0_{ZH \times M} \ I_{M \times M} \ 0_{ZT \times M}]$ represents deleting ZH 0s from the head and deleting ZT 0s from the tail.

The (n, m) DFT de-interpolation operation is performed on N equivalent channel factors obtained after demodulation. To be specific, first, the N equivalent channel factors are transformed to time domain through the N-point IDFT, then ZH+ZT values at the tail are deleted, to obtain an M-length sequence, and finally, the M-length sequence is transformed back to frequency domain through the M-point DFT, to obtain the following sequence:

$$\begin{bmatrix} \rho(0) \\ \rho(1) \\ \vdots \\ \rho(M-1) \end{bmatrix} \approx \text{Real} \left\{ F_M [I_M \ 0_{ZH+ZT}] F_N^H \begin{bmatrix} q(0) \\ q(1) \\ \vdots \\ q(N-1) \end{bmatrix} \right\}$$

In addition, there is a channel compensation factor $\delta(j)$:

$$\delta(j) = \frac{1}{\sigma \sqrt{\frac{N}{M}} - \rho(j)}$$

$\sigma$ is a regulatory factor.

Similarly, the equivalent channel factor is a real value representing an amplitude, and therefore the ZH+ZT values at the tail may be directly deleted to obtain the M-length sequence.

The channel compensation factor is multiplied by each original eighth signal sequence and each equivalent channel factor that is obtained after de-interpolation, to obtain a normalized eighth signal sequence and an equivalent channel factor $\rho'(j)$. The eighth signal sequence is normalized soft information $\alpha'(j)$ of the QAM symbol:

$$\alpha'(j) = \delta(j)\alpha(j)$$

$$\rho'(j) = \delta(j)\rho(j)$$

Specifically, the eighth signal sequence includes soft information of a data symbol, and the length of the eighth signal sequence is less than the length of the seventh signal sequence.

It should be noted that the signal processing process, of the receiving apparatus, based on the DFT interpolation manner shown in FIG. 11 is corresponding to the signal processing process of the transmitting apparatus shown in FIG. 5.

It should be noted that, for an operation of a receiving apparatus of a multicarrier OFDM system based on generalized frequency-domain block interpolation, reference may be made to FIG. 8 and the signal processing process of the receiving apparatus, such as de-interpolation shown in FIG. 10 or FIG. 11, and only an operation opposite to that performed by the transmit end is needed. Details are not described herein.

It should be noted that any parameter may be theoretically selected as the interpolation parameter (m, n) in the embodiments of the present disclosure, and a selecting principle may be determined depending on granularities of different delays and a frequency-domain pilot density requirement. The interpolation parameter reflects, to some extent, a final size of an OFDM symbol and information about a maximum delay that can be supported by the OFDM symbol.

According to the embodiments of the present disclosure, an interpolation operation is introduced to an OFDM symbol modulation process, and the interpolation operation is equivalent to introducing two parts of data: ZH and ZT. According to the embodiments of the present disclosure, a length of ZT and a length of ZH may be controlled by selecting a proper interpolation parameter based on a delay, to ensure that valid data in an OFDM symbol received by the receiving apparatus falls within a valid range, thereby effectively resisting a channel delay and intersymbol interference.

According to the embodiments of the present disclosure, interpolation modulation may be performed on an OFDM symbol that includes only a data symbol, or may be performed on an OFDM symbol that includes only a pilot symbol, or may be performed on an OFDM symbol that includes at least one data symbol and at least one pilot symbol. When the OFDM symbol includes a pilot, it needs to be considered that an interpolation operation performed on a pilot symbol in a transmitted OFDM symbol does not cause phase and amplitude changes.

The data transmission methods provided in the embodiments of the present disclosure are applicable to a multicarrier system. Because of a direct mapping feature of the multicarrier system, a pilot symbol may be interpolated onto any subcarrier location in the multicarrier system. The pilot symbol is a frequency-domain symbol. With reference to the interpolation operation provided in the embodiments of the present disclosure, in the embodiments of the present disclosure, pilot symbols may be interpolated to locations at intervals of an integer multiple between data symbols, and an amplitude of data on an integer multiple interpolation location is controlled, by using an interpolation matrix, to keep unchanged after interpolation. In addition, in the embodiments of the present disclosure, a phase rotation operation needs to be performed on the pilot symbol before or after interpolation, to offset a phase rotation caused to the pilot symbol by a process such as interpolation, so as to ensure that the pilot symbol is transparent relative to the receive end.

It needs to be noted that ZT-OFDM is implemented based on frequency-domain interpolation, and a feature that a signal amplitude keeps unchanged after interpolation is satisfied at an integer multiple interpolation point. Therefore, the pilot symbol may be flexibly interpolated to the integer multiple interpolation point, so that measurement operations such as channel estimation and noise estimation can be performed on the receiving apparatus. The pilot symbol is also referred to as a reference signal (RS).

Studies of 5G mainly relate to pilot symbols such as a channel state information reference signal (CSI-RS), a demodulation reference signal (DMRS), and a phase noise reference signal (PNRS).

The CSI-RS is a channel state information measurement pilot used to perform beam selection measurement, channel quality indicator (CQI) measurement, rank measurement, precoding matrix indicator (PMI) measurement, and the like, and also supports measurement in multipoint coordination. Therefore, the CSI-RS requires measurements on as many as beams and antenna ports. However, sending of the CSI-RS may be triggered based on a time cycle.

Figure 12:
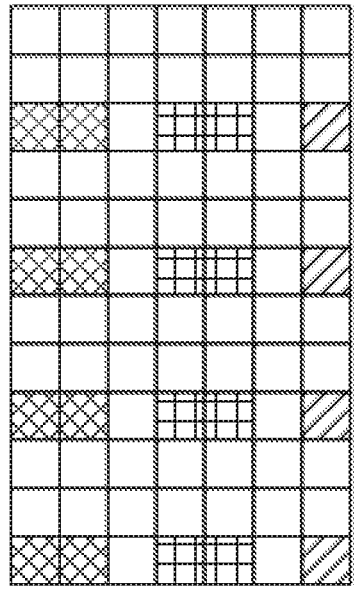
FIG. 12 is a schematic diagram of a CSI-RS pilot design pattern according to an embodiment of the present disclosure.

FIG. 12 is a schematic diagram of a CSI-RS pilot design pattern according to an embodiment of the present disclosure. FIG. 12 shows a manner in which a relatively large multiple interpolation parameter (2, 3) is applied, and some instant control messages may also be simultaneously transmitted during pilot transmission.

FIG. 12 shows three groups of pilot locations, respectively corresponding to port 0 to port 3 in three beams. Because of a time requirement of analog beam switching, different beams may be spaced by one symbol, measurement for four ports is supported in each beam, and a specific pilot multiplexing manner may be frequency division multiplexing (FDM), time division multiplexing (TDM), code division multiplexing (CDM), or the like.

It should be noted that FIG. 12 shows only an example of a CSI-RS pilot interpolation parameter. A person skilled in the art may understand that different CSI-RS interpolation patterns or another pilot interpolation pattern may be designed based on actual frequency-domain or time-domain pilot density.

Figure 13:
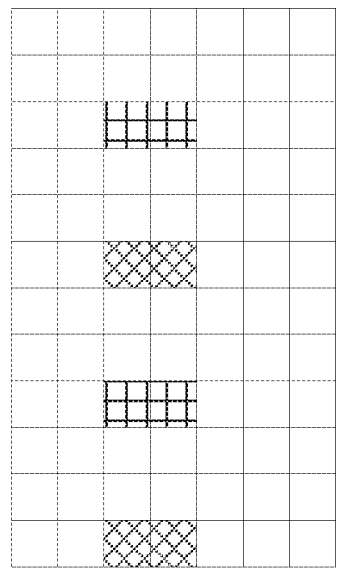
FIG. 13 is a schematic diagram of a DMRS pilot design pattern according to an embodiment of the present disclosure.

A DMRS is a signal demodulation pilot and is generally configured at a user level. The DMRS is associated in signal bandwidth and represents a joint equivalent channel of precoding of a transmitting apparatus and a wireless signal. Therefore, ports of the DMRS are much less than those of the CSI-RS. FIG. 13 is a schematic diagram of a DMRS pilot design pattern according to an embodiment of the present disclosure.

Preferably, when the first signal sequence includes at least one first pilot symbol and at least one data symbol, the interpolation parameter is a fixed preset value.

The DMRS pilot design solution provided in the embodiment shown in FIG. 13 is a manner in which a pilot symbol interpolation ratio is fixed. Considering an adaptive ZT configuration, a user changes an interpolation ratio based on a channel delay variation. However, intervals between locations to which pilots corresponding to different interpolation ratios can be interpolated are different; therefore, to unify different interpolation ratios, a fixed interpolation ratio may be designed for the pilot symbol, but an interpolation ratio of a non-pilot symbol is variable. Two groups of pilot locations are designed in FIG. 13. Each group of pilot locations are corresponding to four ports.

It should be noted that, in the solution shown in FIG. 13, to reduce pilot overheads as many as possible, one group of pilot locations are used by port 1 to port 3 for multiplexing. An FDM manner, a TDM manner, or an OCC orthogonal manner is used by port 0 and port 1 for multiplexing.

To avoid increasing additional pilot location overheads, port 2 and port 3 may perform multiplexing with port 0 and port 1 in a cyclic shift CDM manner. A cyclic shift technology has been applied to uplink in an existing LTE protocol. Specifically, port 2 and port 0 use a same pilot sequence (for example, a Zadoff-Chu (ZC) sequence or a random sequence), and port 2 performs an $e^{j\varphi_i}$ phase rotation one symbol by one symbol based on the pilot sequence, so that channels of the two ports can be split in a time division manner, to be estimated in time-domain channel estimation.

In addition, in a case in which up to eight ports need to be supported, another group of pilot locations are used for multiplexing.

Figure 14:
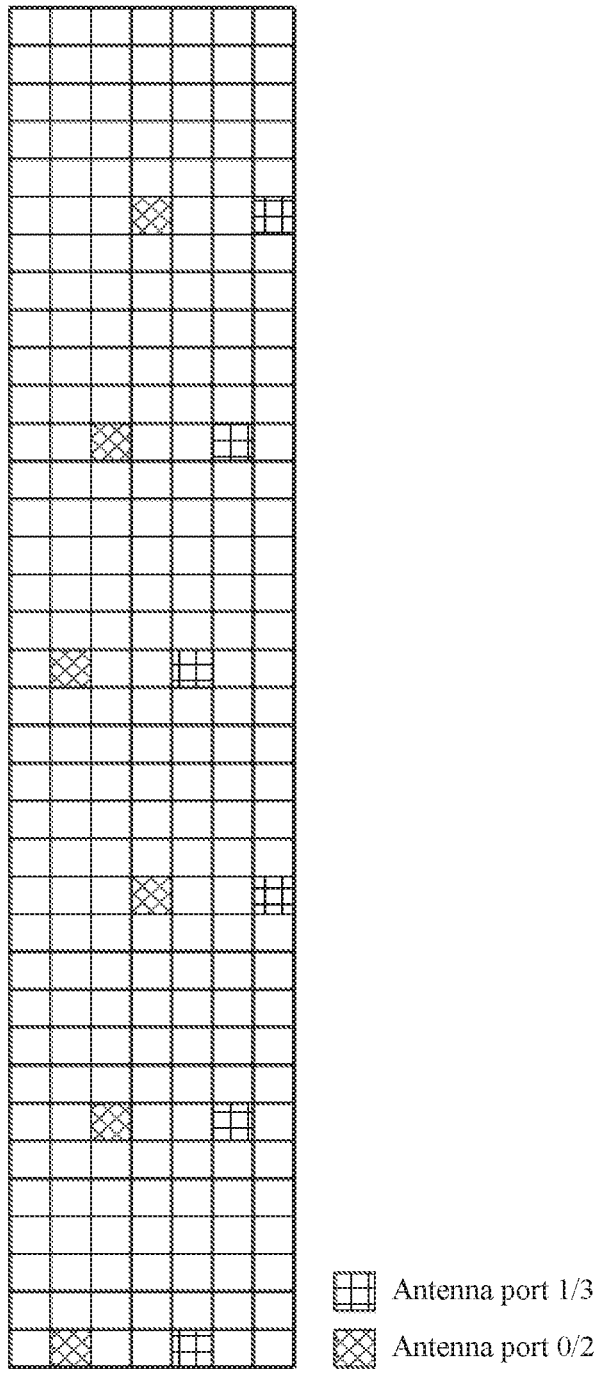
FIG. 14 is a schematic diagram of another DMRS pilot design pattern according to an embodiment of the present disclosure.

It should be noted that the DMRS pilot design solution may alternatively be a pilot symbol design in which an interpolation ratio is variable. FIG. 14 is a schematic diagram of another DMRS pilot design pattern according to an embodiment of the present disclosure.

Preferably, when the first signal sequence includes only at least one data symbol, the interpolation parameter is one of a plurality of interpolation parameters; when the first signal sequence includes at least one first pilot symbol or at least one 0, the first predefined quantity is determined based on the plurality of interpolation parameters.

It should be noted that, in a time delay, there are a plurality of choices for the interpolation parameter. Intervals, of locations to which pilots can be interpolated, corresponding to different interpolation parameters are different. Corresponding to a plurality of interpolation parameters, a plurality of intervals of locations to which pilots can be interpolated are included. Further, the locations, to which pilots can be interpolated, corresponding to the plurality of interpolation parameters are set to a minimum common multiple of a plurality of interpolation intervals, and patterns of the locations, to which pilots can be interpolated, corresponding to the different interpolation parameters are unified, to help the receive end receive a pilot symbol.

Specifically, a minimum common multiple of $n_i$ of a group of interpolation parameters $(m_i, n_i)$ may be selected as a first predefined location when the group of interpolation parameters satisfy the following two conditions: 1. The minimum common multiple of $n_i$ of the group of interpolation parameters is as small as possible, and this determines a pilot frequency-domain interval of symbols. 2. The group of interpolation parameters can cover a sufficient channel delay and uniformly quantize the delay range as far as possible.

A group of interpolation parameters selected in FIG. 14 are (1,2), (2,3), (5,6), and (8,9), and a minimum common multiple of $n_i$ of the group of interpolation parameters is 18; therefore pilots of DMRS symbols are spaced at an interval of 18 subcarriers. Because this interval is relatively large, relatively accurate channel estimation cannot be performed. Therefore, a relatively large quantity of DMRS symbols are considered to be used, and different frequency-domain cyclic shifts are performed on different symbols to achieve a better pilot density effect.

In FIG. 14, each RB has four DMRS pilot symbols; therefore, estimation of four ports may be supported generally. Port 0 and port 2 are multiplexed for a first group of pilot locations in a cyclic shift manner, and port 1 and port 3 are multiplexed for a second group of pilot locations in the cyclic shift manner.

Figure 15:
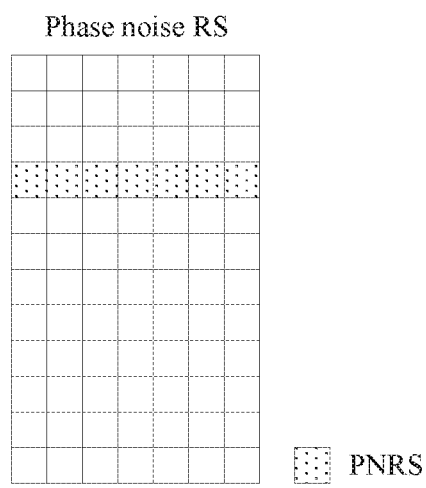
FIG. 15 is a schematic diagram of a PNRS pilot design pattern according to an embodiment of the present disclosure.

FIG. 15 is a schematic diagram of a PNRS pilot design pattern according to an embodiment of the present disclosure. A PNRS is used for estimation of random phase noise caused by a medium-high frequency PA part. The PNRS has a very low requirement on frequency-domain density, and one PNRS may be placed on every dozen of RBs; however, in time domain, a PNRS is required for each symbol. Therefore, a minimum common multiple may be obtained based on $n_i$ of a group of interpolation parameters, and a location of N times the minimum common multiple is set as a phase noise pilot.

For the PNSR pilot pattern design shown in FIG. 15, refer to a manner in which a pilot symbol interpolation ratio is fixed or a manner in which a pilot pattern interpolation ratio (a minimum common multiple) is variable. In addition, for a symbol on which there is a DMRS, a PNSR pilot may not need to be additionally set.

It should be noted that the PNSR pilot pattern shown in FIG. 15 is merely an example. In actual application, only that each symbol has a PNSR needs to be satisfied. In other words, in at least one RE in an OFDM symbol represented by each column shown in FIG. 15, there is a PNSR pilot.

According to the embodiments of the present disclosure, a plurality of pilot pattern designs similar to a pilot pattern design in a 5G standard are implemented, and for the DMRS pilot, two unified pilot patterns may be used to perform adaptive switching of different interpolation parameters, so that an orthogonal effect can be ensured for the DMRS pilot when different interpolation parameters are used by different transmit points in CoMP.

Pilot patterns of an OFDM system in an existing 5G standard are very flexible, and according to the pilot pattern design solutions of interpolating a pilot based on a frequency-domain interval provided in the embodiments of the present disclosure, a ZT-OFDM pilot is constrained by a frequency-domain interval, and a pilot pattern that can approximately achieve an OFDM pilot effect is designed.

It should be noted that, interpolating a pilot symbol only to an integer multiple interpolation point may cause relatively low pilot symbol density and affect quality of channel estimation, noise estimation, and the like, thereby affecting a final throughput. It is considered in the embodiments of the present disclosure that, on a basis that a pilot is interpolated to an integer multiple interpolation point, a pilot is also interpolated to a location beside the integer multiple interpolation point, thereby improving the pilot symbol density.

For ease of understanding, the following briefly explains a principle of the method. A DFT-based interpolation manner is considered, and an interpolation matrix of the manner is represented as follows:

$$Mat_{DFT} = F_N \begin{bmatrix} 0_{ZH} \\ I_M \\ 0_{ZT} \end{bmatrix} F_M^H$$

Referring to the interpolation matrix shown in FIG. 4, values exist only on locations on both sides of the diagonal, so that a symbol after interpolation is basically closely related only to several nearby symbols before interpolation.

In addition, on an integer multiple interpolation location, an element in the matrix is 1, and an $(i*n)^{th}$ value after interpolation is related only to an $(i*m)^{th}$ value before interpolation (an amplitude keeps unchanged but a phase is rotated).

It can be understood that, a coefficient more closer to the integer multiple interpolation point has higher energy, and this indicates that a symbol after interpolation is basically closely related to one symbol before interpolation and is superposed with relatively lower intersymbol interference of several nearby symbols.

For example, in the matrix shown in FIG. 4, an element in a first column is 1, elements on both sides of the diagonal in a second column may be respectively set to 0.9 and 0.1, elements on both sides of the diagonal in a third element may be respectively set to 0.7 and 0.3, elements on both sides of the diagonal in a fourth column may be respectively set to 0.5 and 0.5, and elements on both sides of the diagonal in a fifth column may be respectively set to 0.1 and 0.9, and so on. Therefore, only interference from another 0.1-ratio symbol is caused to elements of the second column. Therefore, two locations on the left and right of the integer multiple interpolation point may also be used to interpolate a pilot (also including a zero power pilot).

Figure 16:
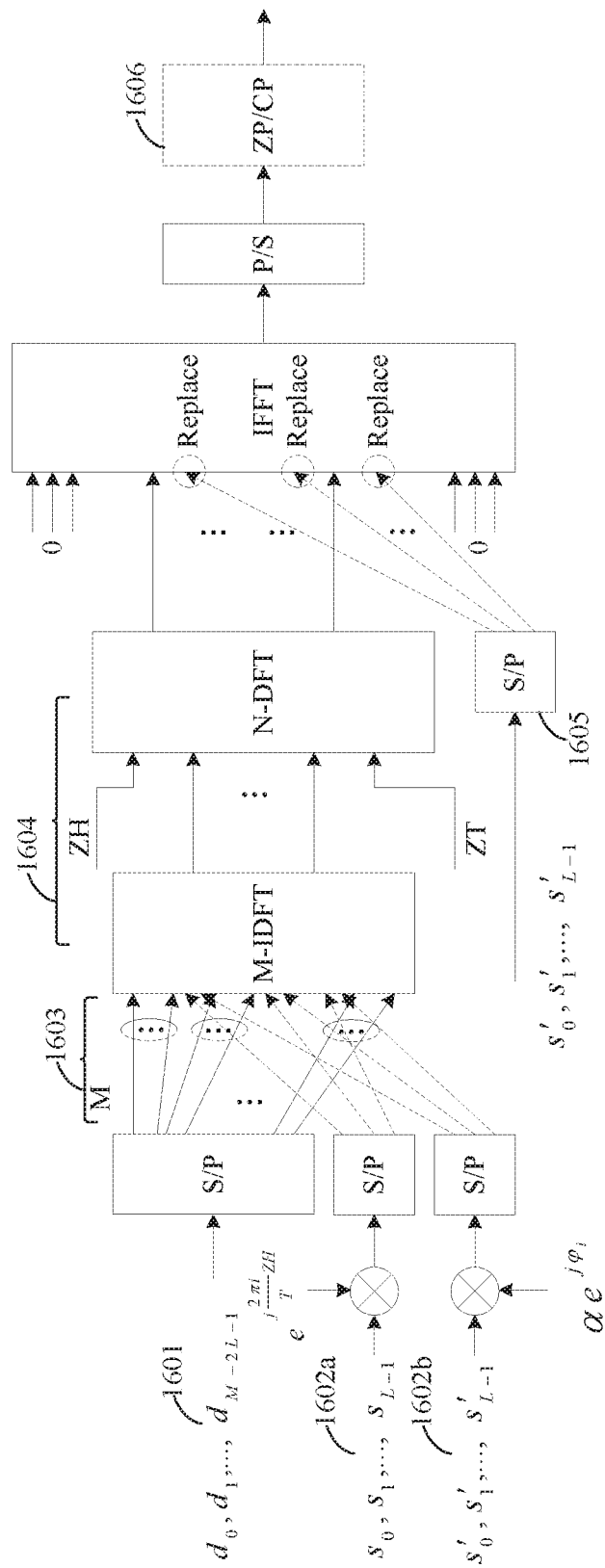
FIG. 16 shows a data transmission method and apparatus that are based on an enhanced pilot solution of frequency-domain DFT interpolation according to an embodiment of the present disclosure.

An enhanced pilot solution is described in the present application by using frequency domain-based DFT interpolation as an example. FIG. 16 is a data transmission method and apparatus that are based on an enhanced pilot solution of frequency-domain DFT interpolation according to an embodiment of the present disclosure. This embodiment includes steps 1601 to 1606.

For the interpolation parameter and the quantity of symbols that need to be generated before the system allocates resources to the user and performs interpolation, refer to the description in FIG. 3.

It should be noted that, for step 1601, step 1604, and step 1606, reference may also be made to the description in step 301, step 304, and step 307, respectively. For brevity, details are not described in the following again.

Step 1602. Generate at least one second pilot symbol and at least one third pilot symbol based on a cell number, a frame number, and the like. A quantity of second pilot symbols is the same as a quantity of third pilot symbols.

In the embodiment shown in FIG. 16, the quantities of second pilot symbols and third pilot symbols are L(L≤T).

Further, to ensure that the receiving apparatus can transparently receive a pilot, step 1602a and step 1602b are included.

Step 1602a. Perform a third-phase rotation on the at least one second pilot symbol, to obtain at least one first pilot symbol.

Specifically, the third-phase rotation may be represented as multiplying a phase rotation factor $$e^{\frac{j2\pi}{T} \cdot iZH}, i \in [0, T),$$

and i is determined depending on a candidate first pilot symbol location that is of a first signal sequence in step 1603 and to which the first pilot symbol is specifically interpolated.

Step 1602b. Perform a fourth-phase rotation and an amplitude adjustment on the at least one third pilot symbol, to obtain at least one fourth pilot symbol.

Specifically, the third-phase rotation and amplitude modulation may be represented as multiplying $\alpha e^{j\varphi_i}$ $$\frac{1}{\alpha} = \frac{1}{M}\sum_{k=0}^{M-1} e^{j2\pi(N-M)dk \over MN}$$

represents a phase variation and amplitude attenuation that are caused by a shift of d, d=1, −1 relative to the integer multiple interpolation point.

$$\varphi_i = \frac{j2\pi(in+d)ZH}{N}$$

represents a phase rotation brought by a location to which the fourth pilot symbol is interpolated. i∈[0, T), and i determined depending on a candidate first pilot symbol location that is of the first signal sequence in step 1603 and to which the fourth pilot symbol is specifically interpolated.

Step 1603. Constitute the first signal sequence according to a third predefined rule by using the at least one fourth pilot symbol, the at least one first pilot symbol, and the at least one data symbol.

The third predefined rule is as follows: at intervals of a first predefined quantity of data symbols, there is a candidate first pilot symbol location, at least one candidate first pilot symbol location is selected to interpolate the first pilot symbol; a neighboring location of the at least one candidate first pilot symbol location is selected to interpolate the fourth pilot symbol; and the first predefined quantity is determined based on the interpolation parameter. In this embodiment, the first predefined quantity may be equal to m−1.

Specifically, after S/P conversation, the at least one data symbol, the at least one first pilot symbol, and the at least one fourth pilot symbol are arranged into an M-length first signal sequence through mix interpolation. The first pilot symbol needs to be interpolated to a location of an integer multiple interpolation point, the location is corresponding to an (i*m)$^{th}$ location of the M-length sequence, and i=0, 1, ..., T−1. After (m,n) fractional multiple DFT interpolation, the locations is corresponding to an (i*n)$^{th}$ location of an N-length sequence. The fourth pilot symbol needs to be interpolated into a location im+d that is shifted by d, d=1, −1 relative to the integer multiple interpolation point.

Step 1605a. Map at least one group of second signal sequences onto a subcarrier to obtain at least one group of second signal sequences that are on the subcarrier.

Further, neighboring locations at intervals of a second predefined quantity of subcarriers are candidate third pilot symbol locations; the third pilot symbol is used to replace a symbol that is of the second signal sequence and that is on a subcarrier on which at least one candidate third pilot symbol location resides; the second predefined quantity is determined based on the interpolation parameter; the second predefined quantity is greater than the first predefined quantity; and in the second signal sequence, a location replaced by the third pilot symbol is related to a location to which the fourth pilot symbol is interpolated in the first signal sequence.

A second signal sequence constituted by N symbols is consecutively mapped onto N subcarriers in frequency domain, and then a value on a corresponding subcarrier location in +d is replaced with at least one fourth pilot symbol based on the interpolation location im+d before interpolation. The operation ensures that pilot information of the subcarrier is saved and inter-interpolation interference caused by another subcarrier is avoided.

Step 1605b. Perform an inverse fast Fourier transform IFFT on a second signal sequence that is on a subcarrier, to obtain a time-domain signal.

Finally, a conventional IFFT operation is performed, and for multilayer MIMO transmission, before the IFFT, operations such as layer mapping and precoding are further included.

According to the enhanced pilot solution provided in this embodiment of the present disclosure, some locations on which pilots can be configured are added to both sides of an original pilot location; therefore, orthogonality is improved and a maximum quantity of ports that can be supported increases.

It can be understood that, for the pilot pattern design of the present application, reference may be made to the fixed interpolation ratio solution and the variable interpolation ratio (the minimum common multiple interpolation location) solution provided in the foregoing embodiments. Details are not described herein.

Figure 17:
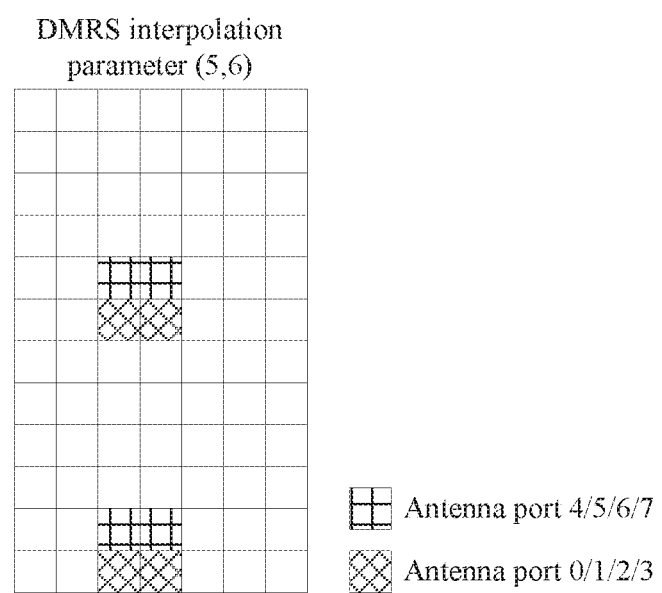
FIG. 17 is a schematic diagram of an enhanced DMRS pilot design pattern according to an embodiment of the present disclosure.

FIG. 17 is a schematic diagram of an enhanced DMRS pilot design pattern according to an embodiment of the present disclosure. As shown in FIG. 17, there are more pilot locations; therefore, a lower interpolation ratio, for example, an interpolation parameter (5,6), may be used in the DMRS pilot solution in this embodiment, so as to ensure a relatively high data transmission rate of the symbol.

Manners of port 0 to port 3 in FIG. 17 are the same as those in FIG. 13, and pilot symbols of port 4 to port 7 may be placed beside pilot symbols of port 0 to port 3. For orthogonality between the two groups of ports, at least one third pilot symbol may be configured to be zero power by using the technology shown in FIG. 13, to avoid interference between the two groups of ports, or at least one normal-power third pilot symbol may be configured in an OCC orthogonal manner, to implement OCC orthogonality between the two groups of ports.

It should be noted that which third pilot symbol is configured to be zero power or which normal-power third pilot symbol is configured in the OCC orthogonal manner may be specifically set depending on different groups of ports, to avoid interference or ensure OCC orthogonality between different groups of ports.

Figure 18:
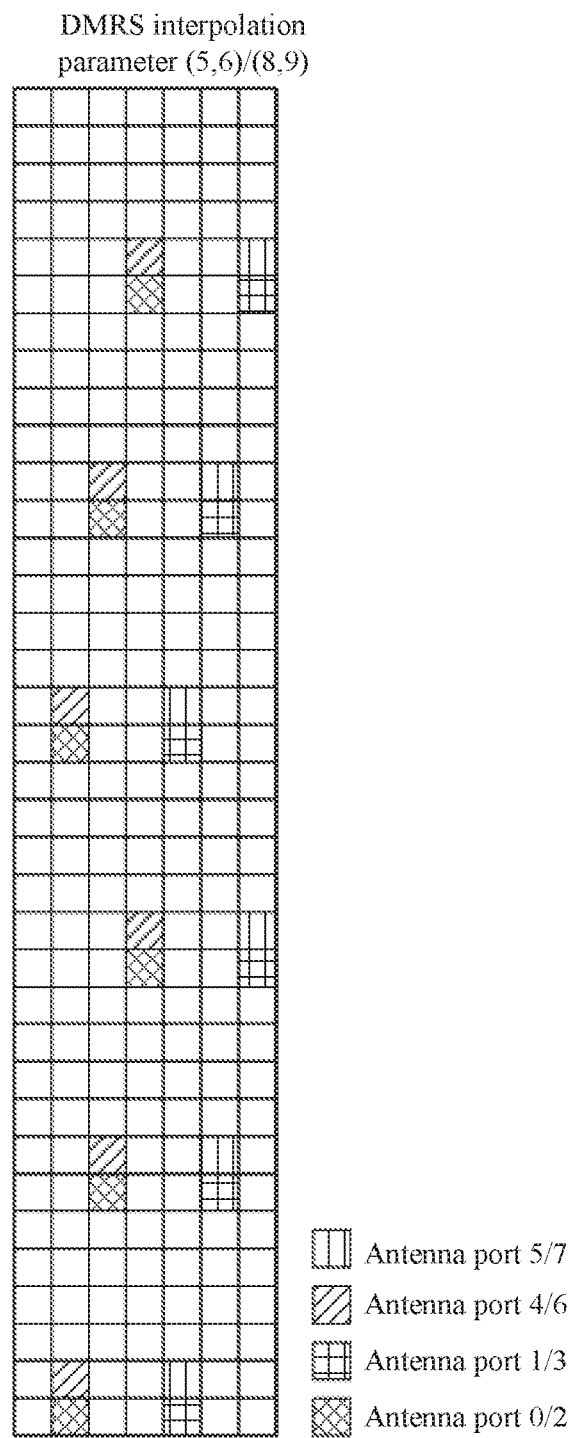
FIG. 18 is a schematic diagram of another enhanced DMRS pilot design pattern according to an embodiment of the present disclosure.

FIG. 18 is a schematic diagram of another enhanced DMRS pilot design pattern according to an embodiment of the present disclosure. Based on the solution shown in FIG. 14, the enhanced DMRS pilot pattern solution in this embodiment adds a group of ports, namely, port 4 to port 7, beside port 0 to port 3, and orthogonality between the two groups of ports may also be implemented in a manner of configuring at least one third pilot symbol to be zero power or configuring at least one normal-power third pilot in the OCC orthogonal manner.

It should be noted that a candidate third pilot symbol location is on a location im+d that shifted by d,d=1,−1 relative to the candidate first pilot symbol location. To which candidate location the third pilot symbol is specifically interpolated is not associated with a location to which the first pilot symbol is interpolated. FIG. 17 or FIG. 18 shows only one of enhanced pilot patterns.

According to the technical solutions provided in the embodiments of the present disclosure, symbols on both sides of an integer multiple interpolation point are used to send a pilot signal, so that density of usable pilot locations can be improved. Further, more ports can be supported, or an effect that more data symbols can be transmitted by using pilot symbols is achieved.

In an example, it is assumed that N is always 12 subcarriers and a pilot symbol always occupies four subcarriers. When the enhanced pilot solution is not used, the interpolation parameter may be (2,3); therefore, M corresponding to m=2 and n=3 is eight symbols, where four are pilot symbols, and therefore four are data symbols. When the enhanced pilot solution is used, the interpolation parameter is (5,6); therefore, M corresponding to m=5 and n=6 is 10 symbols, where four are pilot symbols, and therefore six are data symbols. In other words, when quantities of pilot symbols are the same, an effect of transmitting more data symbol is achieved by using the enhanced pilot solution.

Figure 19:
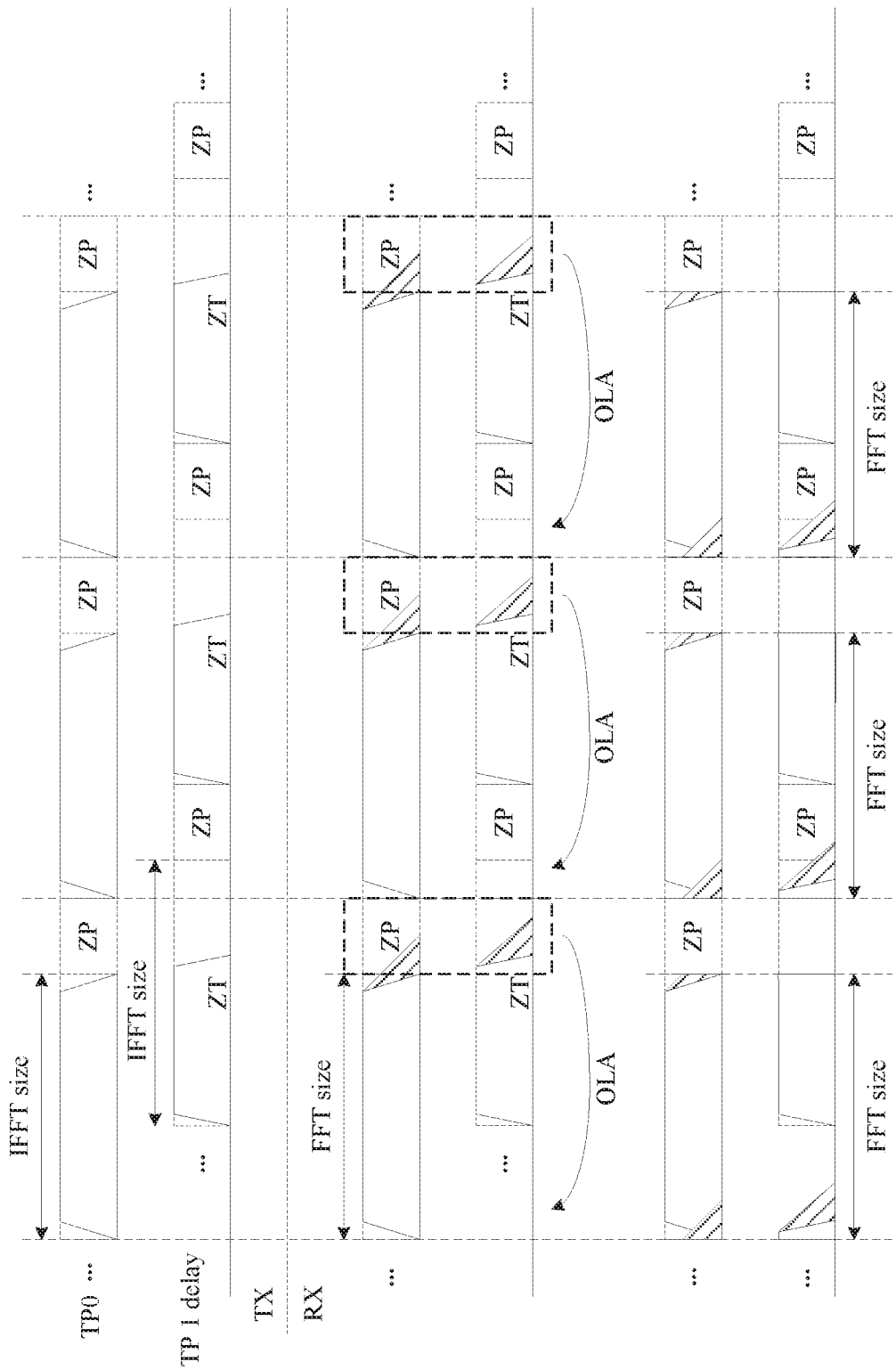
FIG. 19 is a schematic diagram of an asynchronous data transmission method applied to a plurality of transmit points according to an embodiment of the present disclosure.

Correspondingly, the embodiments of the present disclosure provide a solution applied to multipoint asynchronous transmission, so that the receive end can receive signals in a joint MIMO manner. FIG. 19 is a schematic diagram of an asynchronous data transmission method applied to a plurality of transmit points according to an embodiment of the present disclosure.

Specifically, when at least one transmitting apparatus coordinately sends data to a receive end, the at least one transmitting apparatus includes a service transmitting apparatus and a coordinated transmitting apparatus, and the coordinated transmitting apparatus determines an interpolation parameter based on a delay deviation of the coordinated transmitting apparatus relative to the service transmitting apparatus, so that the receiving apparatus performs joint MIMO receiving on signals of the at least one transmitting apparatus.

Referring to the description in the embodiments shown in FIG. 3, FIG. 5, and the like, the head and the tail of the second signal sequence each include a plurality pieces of data less than a preset threshold. Specifically, the data less than preset threshold may be data that is approximate to 0.

When a signal is transmitted to a terminal user in a downlink multi-coordinated point incoherent manner, or during uplink multiuser co-time co-frequency asynchronous competitive access, the manner in FIG. 19 may be applied. In FIG. 19, an example in which transmission is performed by two downlink transmission points is used.

A terminal device may receive data that is coordinately transmitted by at least two transmission points (TP). It is assumed that the two transmission points are TP 0 and TP 1.

The terminal device is connected to TP 0 of a target cell, and performs timing based on TP 0; therefore, TP 0 may perform transmission in a manner without a ZT (interpolation is not performed, and an interpolation ratio is 1). TP 0 may be referred to as a service transmit point.

The terminal device measures signal receive power of each downlink TP point, and selects TP 1 as a coordinated transmission point. When TP 1 and TP 0 do not share a timing, a delay deviation exists between signals received by the terminal device and transmitted by TP 1 and TP 0. The terminal device measures a delay deviation of TP 1, and feeds back a delay deviation quantization indication to TP 1 by using an uplink control channel. TP 1 selects, based on a received delay deviation value, a proper ZT-OFDM interpolation parameter, to perform interpolation on data, and then sends a signal to the terminal device. The terminal device performs joint MIMO receiving on signals of the two TPs.

Specifically, as shown in FIG. 19, TP 1 has a delay deviation (TP 1 delay) relative to TP 0. A length of a ZT in the signal of TP 1 is controlled by selecting a proper interpolation parameter, so that a valid signal of TP 1 entirely falls in one cycle of the receive end, or a valid signal of TP 1 entirely falls in IFFTsize of TP 0. Refer to FIG. 19.

The valid signal is data, from which a ZT part and a ZH part are removed, in IFFTsize. A ZH accounts for a relatively small proportion, and therefore is not shown in FIG. 19.

In FIG. 19, joint MIMO receiving is performed on the signals of the two TPs in a relatively simple OLA manner.

It can be understood that, in actual application, the application manner shown in FIG. 19 may further include another coordinated TP, and the terminal device measures a delay deviation of each coordinated TP relative to TP 0, and feeds back a delay deviation quantization indication to the coordinated TP by using the uplink control channel. The coordinated TP selects, based on a received delay deviation value, a proper ZT-OFDM interpolation parameter, to perform interpolation on data, and then sends a signal to the terminal device, so as to ensure that all valid signals of a plurality of TPs entirely fall in IFFTsize of TP 0. Therefore, the terminal device can perform joint MIMO receiving on the signals of the plurality of TPs.

To ensure joint multipoint asynchronous transmission, in the prior art, transmission can be performed only in an extended CP manner. In this way, both a TP without a delay deviation and a TP with a short delay deviation need to perform transmission based on a format of a relatively long CP, and this reduces signal rates of the TPs.

The multipoint asynchronous transmission technology provided in this embodiment of the present disclosure can ensure that a plurality of transmission points whose timings are different select, based on respective delay deviations, proper ZT-OFDM interpolation parameters to send signals, and can also ensure that the receiving apparatus performs receiving in the joint MIMO manner. Compared with performing simple successive interference cancellation (SIC), this technology has better performance and a shorter processing delay.

In a 5G standard, in consideration of coexistence of a plurality of services, a multi-numerology scenario may exist. In other words, services with different subcarrier spacings (such as, 15 KHz, 30 KHz, and 60 KHz) coexist. Frequency-domain Sinc window functions of different subcarrier spacings are different; therefore, a guard band (GB) needs to be reserved between the services with different subcarrier spacings, to protect subcarriers.

According to this embodiment of the present disclosure, a ZT-OFDM feature is used to construct a shorter time interval in time domain, so as to achieve an effect of a wider subcarrier spacing.

In an example, when an interpolation ratio is 2, the transmitting the time-domain signal further includes: including, by the time-domain signal, a first time-domain signal and a second time-domain signal, where a time length occupied by the first time-domain signal is the same as a time length occupied by the second time-domain signal; clipping the first time-domain signal and the second time-domain signal to obtain a third time-domain signal and a fourth time-domain signal, respectively, where the second time-domain signal delays for a half cycle in time domain compared with the first time-domain signal, a time length occupied by the third time-domain signal is half of the time length occupied by the first time-domain signal, and a time length occupied by the fourth time-domain signal is half of the time length occupied by the second time-domain signal; mixing the third time-domain signal and the fourth time-domain signal to obtain a fifth time-domain signal; and transmitting the fifth time-domain signal, where the half cycle is half of the time length occupied by the first time-domain signal.

Specifically, an IFFT/2 window function is used to clip the first time-domain signal and the second time-domain signal, to remove a plurality pieces of data that are less than a preset threshold and that are at the head and the tail of the first time-domain signal or the second time-domain signal.

In the foregoing example, a T/2 time interval is constructed, so that an effect equivalent to a 30 K subcarrier spacing is achieved.

In another example, when the interpolation ratio is 4, the transmitting the time-domain signal further includes: including, by the time-domain signal, a sixth time-domain signal, a seventh time-domain signal, an eighth time-domain signal, and a ninth time-domain signal, where a time length occupied by the sixth time-domain signal, a time length occupied by the seventh time-domain signal, a time length occupied by the eighth time-domain signal, and a time length occupied by the ninth time-domain signal are the same; clipping the sixth time-domain signal, the seventh time-domain signal, the eighth time-domain signal, and the ninth time-domain signal, to obtain a tenth time-domain signal, an eleventh time-domain signal, a twelfth time-domain signal, and a thirteenth time-domain signal, respectively, where the seventh time-domain signal delays for a quarter of a cycle in time domain compared with the sixth time-domain signal, the eighth time-domain signal delays for a quarter of a cycle in time domain compared with the seventh time-domain signal, the ninth time-domain signal delays for a quarter of a cycle in time domain compared with the eighth time-domain signal, a time length occupied by the tenth time-domain signal is a quarter of the time length occupied by the sixth time-domain signal, a time length occupied by the eleventh time-domain signal is a quarter of the time length occupied by the seventh time-domain signal, a time length occupied by the twelfth time-domain signal is a quarter of the time length occupied by the eighth time-domain signal, and a time length occupied by the thirteenth time-domain signal is a quarter of the time length occupied by the ninth time-domain signal; mixing the tenth time-domain signal, the eleventh time-domain signal, the twelfth time-domain signal, and the thirteenth time-domain signal, to obtain a fourteenth time-domain signal; and transmitting the fourteenth time-domain signal, where the quarter of the cycle is a quarter of the time length occupied by the sixth time-domain signal.

Specifically, an IFFT/4 window function is used to clip the sixth time-domain signal, the seventh time-domain signal, the eighth time-domain signal, and the ninth time-domain signal, to remove a plurality pieces of data that are less than a preset threshold and that are at the heads and the tails of the sixth time-domain signal, the seventh time-domain signal, the eighth time-domain signal, and the ninth time-domain signal.

In the foregoing another example, a T/4 time interval is constructed, so that an effect equivalent to a 60K subcarrier spacing is achieved.

Figure 20:
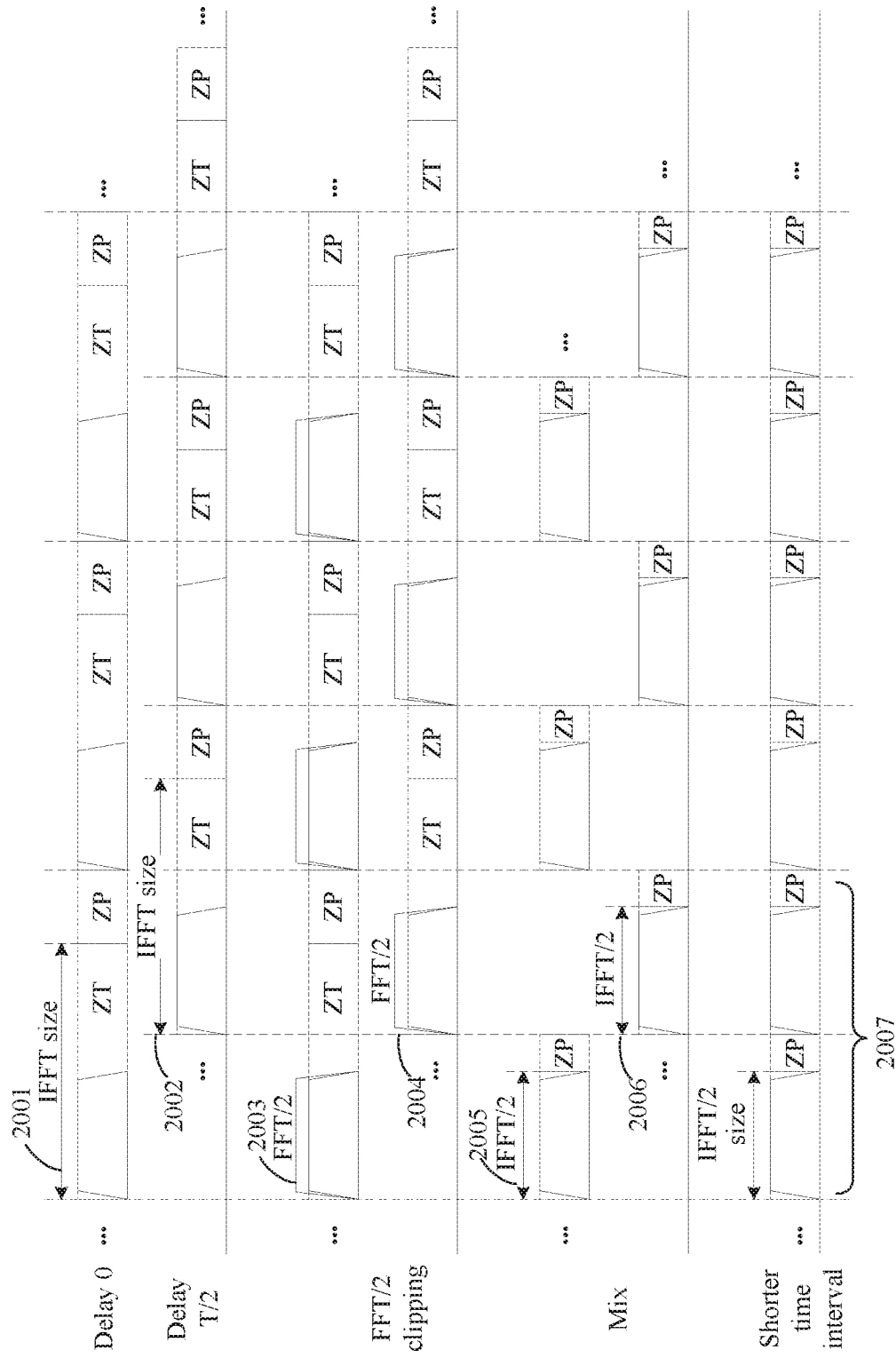
FIG. 20 is a schematic diagram of a data transmission method in which a time interval is shorter according to an embodiment of the present disclosure.

In this embodiment of the present disclosure, an example of constructing a T/2 time interval is used for detailed description. FIG. 20 is a schematic diagram of a data transmission method in which a time interval is shorter according to an embodiment of the present disclosure.

As shown in FIG. 20, a transmit end uses an interpolation parameter (1,2), to obtain a first time-domain signal and a second time-domain signal. A time length occupied by the first time-domain signal is the same as a time length occupied by the second time-domain signal, and it is assumed that the time length occupied by the first time-domain signal is FFTsize. It is assumed that a time-domain cycle corresponding to FFTsize is T, and a subcarrier spacing corresponding to the time domain cycle T is 15 K.

ZTs, approximate to an IFFT/2 length, in the first time-domain signal and the second time-domain signal, are approximate to zero powers. As shown by a part 2001 and a part 2002 in FIG. 20, an inter-signal delay between the first time-domain signal and the second time-domain signal is T/2 (a delay 0 and a delay T/2).

An IFFT/2 window function is used to respectively clip valid signal parts of the first time-domain signal and the second time-domain signal, to obtain a third time-domain signal and a four time-domain signal that are shown by a part 2003 and a part 2004 in FIG. 20. The window function may be a rectangular window, or may be another window function with a roll-off.

Zero power tails in a ZP/2 length are separately added to the ends of the third time-domain signal and the fourth time-domain signal, to respectively form two time-domain signals spaced by a shorter time interval whose time-domain length is T/2, as shown by a part 2005 and a part 2006 in FIG. 20.

The third time-domain signal and the fourth time-domain signal to which the ZP/2 length zero power tails are added are mixed, to obtain a fifth time-domain signal shown by a part 2007 in FIG. 20.

The fifth time-domain signal is transmitted. A length of the fifth time-domain signal is the same as the length of the original first time-domain signal or second time-domain signal, that is, is FFTsize. However, a time-domain time interval constructed for the fifth time-domain signal is T/2, and this achieves an effect of twice the subcarrier spacing.

Correspondingly, a receiving apparatus receives a signal that is in a T/2 window, and processes a ZP part of the tail in an OLA manner; adds an FFT/2 zero power signal to the tail of an FFT/2-length signal; and a final FFT-length signal is sent to a receive end for ZT-OFDM processing in which an interpolation parameter (1,2) is used.

It can be understood that, if an interpolation parameter (1,4) is used, an effect similar to a 60 K subcarrier spacing is achieved. In addition, time division multiplexing may also be performed on signals of a plurality of terminal devices in the manner shown in FIG. 20. In other words, time division multiplexing is performed, by using the interpolation parameter (1,2) or (1,4), on the signals of the plurality of terminal device in a clipping and mixing manner.

According to the solution provided in this embodiment of the present disclosure, a ZT-OFDM feature is used to construct a shorter time interval in time domain, so as to achieve an effect of a wider subcarrier spacing. In addition, all subcarrier spacings between different services are 15 K at an air interface, and no mutual ICI interference exists. Compared with a scenario in which 15 K, 30 K, and 60 K subcarrier spacings are multiplexed in a multi-numerology scenario in 5G, this embodiment has no ICI interference because all subcarrier spacings are 15 K at the air interface, and therefore frequency-domain GBs can be reduced and a throughput can be effectively improved.

According to the data transmission methods provided in the embodiments of the present disclosure, the transmit end performs, based on a maximum channel delay deviation measured by the receive end, a fractional multiple interpolation filtering operation of a particular ratio on a modulated symbol that is mapped onto frequency domain, to finally achieve, after an IFFT, an effect that ZH pieces of data at the signal head and ZT pieces of data at the signal tail are approximate to a zero power. In addition, before interpolation, a frequency-domain RS pilot signal may be interpolated to an integer multiple interpolation location, and to ensure that an RS is transparent to the receiving apparatus, a phase rotation operation is performed on the interpolated frequency-domain RS based on a time-domain offset of the signal.

A consecutive signal may be formed by directly connecting in series OFDM time-domain symbols that are formed through interpolation in the embodiments of the present disclosure, and in this case, it needs to ensure that a length of a ZT can cover a total channel delay deviation. Alternatively, ZP zero power signals may be added to the tail of each symbol obtained after an IFFT, or CP zero power signals at the tail of a symbol may be duplicated to the head of the symbol, to form a cyclic prefix signal, so that an effect that the zero power signals are connected to the ZP or CP zero power signals in the symbol is achieved. Choices of a plurality of solutions provided in the embodiments of the present disclosure may be finally in accordance with a frame format in a 5G standard.

The interpolation filter in the embodiments of the present disclosure is not limited to the DFT interpolation filter, and may also be a plurality of interpolation algorithms such as linear interpolation and spline interpolation. The DFT interpolation filter includes an IDFT, padding a zero power head or tail before or after a signal in time domain, and a DFT. Lengths of the zero head (ZH) and the ZT are adjustable.

The embodiments of the present disclosure provide the OFDM time-domain symbol formed through interpolation, and a larger corresponding interpolation ratio means a stronger capability of resisting a channel delay deviation. A plurality of interpolation ratio ranges are set for the maximum delay deviation based on an interval, and the transmitting apparatus selects an interpolation ratio based on a measured maximum delay deviation, and notifies the receiving apparatus of the interpolation ratio by using a control message, or the receiving apparatus performs blind detection based on a pilot format or a zero power length.

According to the embodiments of the present disclosure, data symbols and pilot symbols of a user may be grouped into a plurality of blocks, an interpolation operation is independently performed on each block, and finally, the blocks may be discretely distributed in frequency domain, so that a better scheduling gain or frequency-domain diversity gain is obtained.

According to the solutions provided in the embodiments of the present disclosure, the pilot symbol may be interpolated in a manner in which an interpolation ratio is fixed, but an interpolation ratio of a non-pilot symbol is variable. In this way, a same pilot pattern can be ensured to be reused in different interpolation parameter configurations.

According to the solutions provided in the embodiments of the present disclosure, the pilot symbol may alternatively be interpolated in a manner in which an interpolation ratio is variable. To satisfy that a same pilot pattern is reused in different interpolation parameter configurations, a group of interpolation parameters ($m_i$, $n_i$) need to be selected, and a selection rule needs to satisfy that a minimum common multiple of $n_i$ of the group of parameters is as small as possible, so as to ensure sufficient pilot frequency-domain density. In addition, the group of parameters can cover a sufficient channel delay, and the delay range is uniformly quantized as far as possible.

According to the solutions provided in the embodiments of the present disclosure, in addition to that the pilot symbol may be interpolated to the integer multiple interpolation point, for a relatively low interpolation ratio, a pilot symbol or zero power symbol may also be interpolated to a limited quantity of points at the left and right of the integer multiple interpolation point. In this case, a phase rotation and an amplitude adjustment need to be performed on the symbol during interpolation, and in addition, when a symbol on which the phase rotation and the amplitude adjustment are performed is mapped onto a subcarrier after interpolation, a symbol on a corresponding location is replaced with a pilot symbol or zero power symbol that is interpolated before interpolation.

Figure 21:
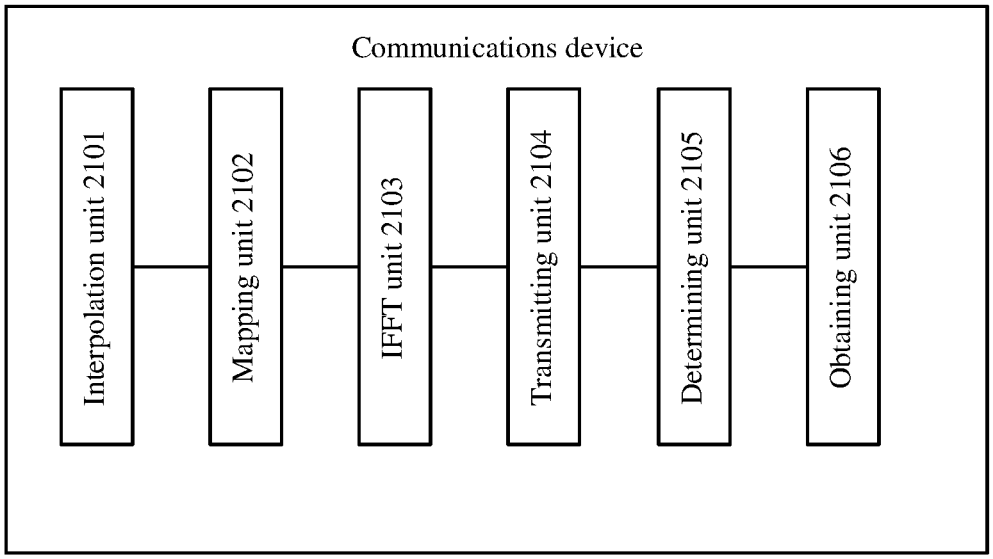
FIG. 21 is an architectural diagram of a communications device according to an embodiment of the present disclosure.

Correspondingly, an embodiment of the present disclosure provides a communications device, configured to implement the data transmission method provided in the foregoing embodiments. As shown in FIG. 21, the communications device includes an interpolation unit 2101, a mapping unit 2102, an IFFT unit 2103, a transmitting unit 2104, a determining unit 2105, and an obtaining unit 2106.

The interpolation unit 2101 of the communications device is configured to perform an interpolation operation on a first signal sequence to obtain a second signal sequence, where a length of the second signal sequence is greater than a length of the first signal sequence.

The mapping unit 2102 is configured to map the second signal sequence onto a subcarrier to obtain a second signal sequence that is on the subcarrier.

The IFFT unit 2103 is configured to perform an inverse fast Fourier transform IFFT on the second signal sequence that is on the subcarrier, to obtain a time-domain signal.

The transmitting unit 2104 is configured to transmit the time-domain signal.

Preferably, the communications device further includes the determining unit 2105, configured to determine an interpolation parameter; and the interpolation unit 2101 is specifically configured to perform the interpolation operation on the first signal sequence based on the interpolation parameter, to obtain the second signal sequence.

Preferably, the communications device further includes the obtaining unit 2106, configured to obtain a maximum delay deviation of a signal of a terminal device, where the signal of the terminal device is a wireless signal sent to the terminal device or a wireless signal sent by the terminal device, and the maximum delay deviation is a difference between an earliest time and a latest time at which the signal of the terminal device arrives at a receiving apparatus through a wireless channel after the signal of the terminal device is sent from a transmit end; and the determining unit 2105 is specifically configured to determine the interpolation parameter based on the maximum delay deviation of the signal of the terminal device.

Preferably, the interpolation unit 2101 is specifically configured to: perform an inverse discrete Fourier transform IDFT on the first signal sequence to obtain a fourth signal sequence; add ZH 0s to the head of the fourth signal sequence, and add ZT 0s to the tail of the fourth signal sequence, to obtain a fifth signal sequence, where both ZH and ZT are integers greater than 0; and perform a discrete Fourier transform DFT on the fifth signal sequence to obtain the second signal sequence, where the length of the second signal sequence equals a sum of the length of the first signal sequence, ZH, and ZT.

Specifically, the interpolation unit 2101 may be further implemented by a replacement solution such as generalized interpolation, or interpolating 0 to a pilot location. For details, refer to the description in FIG. 3, FIG. 5, FIG. 6, and FIG. 7. Details are not described herein.

Preferably, the first signal sequence includes at least one data symbol.

Preferably, the first signal sequence includes at least one first pilot symbol, the first pilot symbol is obtained by performing a third-phase rotation on a second pilot symbol, and the second pilot symbol is used by the receiving apparatus to perform at least one of channel measurement and channel estimation.

Preferably, the first signal sequence further includes at least one data symbol, where the at least one first pilot symbol and the at least one data symbol constitute the first signal sequence according to a first predefined rule; and the first predefined rule is as follows: in the first signal sequence, at intervals of a first predefined quantity of data symbols, there is a candidate first pilot symbol location, and at least one candidate first pilot symbol location is selected to interpolate the first pilot symbol, where the first predefined quantity is determined based on the interpolation parameter.

Specifically, the first signal sequence may include a plurality of symbols and a plurality of symbol permutations. Refer to the description in FIG. 3 and FIG. 5. Details are not described herein.

Preferably, the mapping unit 2102 is specifically configured to map at least one group of second signal sequences onto the subcarrier to obtain at least one group of second signal sequences that are on the subcarrier.

Specifically, for a block interpolation mapping solution, refer to the description in FIG. 8. Details are not described herein.

Preferably, the transmitting unit 2104 is further configured to send information related to the interpolation parameter. The information related to the interpolation parameter is used by the receiving apparatus to determine the interpolation parameter.

For a specific operation process of the communications device provided in this embodiment of the present disclosure, refer to the detailed description in FIG. 3 to FIG. 20. Details are not described herein.

Figure 22:
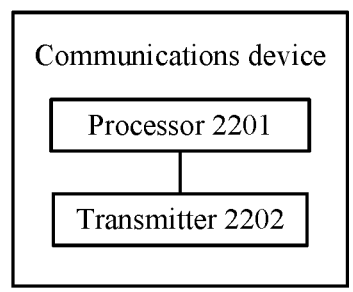
FIG. 22 is an architectural diagram of another communications device according to an embodiment of the present disclosure.

It should be noted that the communications device shown in FIG. 21 may be further implemented in the following implementation. Specifically, as shown in FIG. 22, the communications device includes a processor 2201 and a transmitter 2202.

The processor 2201 of the communications device is configured to perform an interpolation operation on a first signal sequence to obtain a second signal sequence, where a length of the second signal sequence is greater than a length of the first signal sequence.

The processor 2201 is further configured to map the second signal sequence onto a subcarrier to obtain a second signal sequence that is on the subcarrier.

The processor 2201 is further configured to perform an inverse fast Fourier transform IFFT on the second signal sequence that is on the subcarrier, to obtain a time-domain signal.

The transmitter 2202 is configured to transmit the time-domain signal.

Preferably, the processor 2201 is further configured to determine an interpolation parameter; and the processor 2201 is specifically configured to perform the interpolation operation on the first signal sequence based on the interpolation parameter, to obtain the second signal sequence.

Preferably, the processor 2201 is further configured to obtain a maximum delay deviation of a signal of a terminal device, where the signal of the terminal device is a wireless signal sent to the terminal device or a wireless signal sent by the terminal device, and the maximum delay deviation is a difference between an earliest time and a latest time at which the signal of the terminal device arrives at a receiving apparatus through a wireless channel after the signal of the terminal device is sent from a transmit end; and the processor 2201 is specifically configured to determine the interpolation parameter based on the maximum delay deviation of the signal of the terminal device.

Preferably, the processor 2201 is specifically configured to: perform an inverse discrete Fourier transform IDFT on the first signal sequence to obtain a fourth signal sequence; add ZH 0s to the head of the fourth signal sequence, and add ZT 0s to the tail of the fourth signal sequence, to obtain a fifth signal sequence, where both ZH and ZT are integers greater than 0; and perform a discrete Fourier transform DFT on the fifth signal sequence to obtain the second signal sequence, where the length of the second signal sequence equals a sum of the length of the first signal sequence, ZH, and ZT.

Specifically, the processor 2201 may be further implemented by a replacement solution such as generalized interpolation, or interpolating 0 to a pilot location. For details, refer to the description in FIG. 3, FIG. 5, FIG. 6, and FIG. 7. Details are not described herein.

Preferably, the first signal sequence includes at least one data symbol.

Preferably, the first signal sequence includes at least one first pilot symbol, the first pilot symbol is obtained by performing a third-phase rotation on a second pilot symbol, and the second pilot symbol is used by the receiving apparatus to perform at least one of channel measurement and channel estimation.

Preferably, the first signal sequence further includes at least one data symbol, where the at least one first pilot symbol and the at least one data symbol constitute the first signal sequence according to a first predefined rule; and the first predefined rule is as follows: in the first signal sequence, at intervals of a first predefined quantity of data symbols, there is a candidate first pilot symbol location, and at least one candidate first pilot symbol location is selected to interpolate the first pilot symbol, where the first predefined quantity is determined based on the interpolation parameter.

Specifically, the first signal sequence may include a plurality of symbols and a plurality of symbol permutations. Refer to the description in FIG. 3 and FIG. 5. Details are not described herein.

Preferably, the processor 2201 is specifically configured to map at least one group of second signal sequences onto the subcarrier to obtain at least one group of second signal sequences that are on the subcarrier.

Specifically, for a block interpolation mapping solution, refer to the description in FIG. 8. Details are not described herein.

Preferably, the transmitter 2202 is further configured to send information related to the interpolation parameter. The information related to the interpolation parameter is used by the receiving apparatus to determine the interpolation parameter.

For a specific operation process of the communications device provided in this embodiment of the present disclosure, refer to the detailed description in FIG. 3 to FIG. 20. Details are not described herein.

Figure 23:
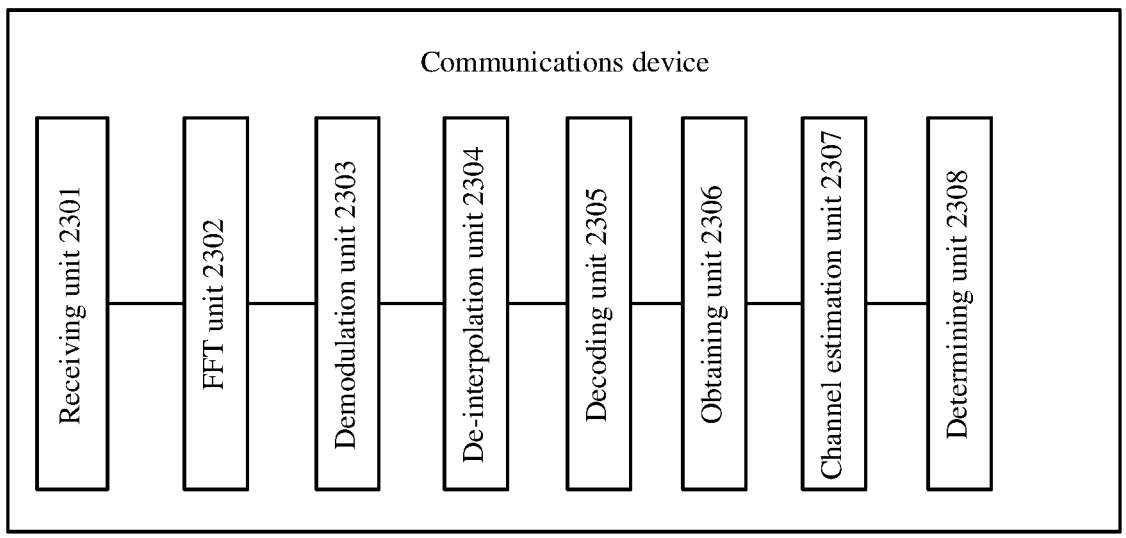
FIG. 23 is an architectural diagram of still another communications device according to an embodiment of the present disclosure.

Correspondingly, an embodiment of the present disclosure provides another communications device, configured to implement the data transmission method provided in the foregoing embodiments. As shown in FIG. 23, the communications device includes a receiving unit 2301, an FFT unit 2302, a demodulation unit 2303, a de-interpolation unit 2304, a decoding unit 2305, an obtaining unit 2306, a channel estimation unit 2307, and a determining unit 2308.

The receiving unit 2301 of the communications device is configured to receive a time-domain signal.

The FFT unit 2302 is configured to perform a fast Fourier transform FFT on the time-domain signal to obtain a sixth signal sequence that is on a subcarrier.

The demodulation unit 2303 is configured to demodulate the sixth signal sequence to obtain a seventh signal sequence.

The de-interpolation unit 2304 is configured to perform a de-interpolation operation on the seventh signal sequence to obtain an eighth signal sequence, where the eighth signal sequence includes soft information of a data symbol, and a length of the eighth signal sequence is less than a length of the seventh signal sequence.

The decoding unit 2305 is configured to decode the soft information of the data symbol to obtain the data symbol.

Preferably, the communications device further includes: the obtaining unit 2306, configured to obtain a pilot symbol; and the channel estimation unit 2307, configured to perform channel estimation based on the pilot symbol, to obtain channel-related information; and the demodulation unit 2303 is specifically configured to demodulate the sixth signal sequence based on the channel-related information, to obtain the seventh signal sequence.

Preferably, the communications device further includes the determining unit 2308, configured to determine an interpolation parameter; and the de-interpolation unit 2304 is specifically configured to perform the de-interpolation operation on the seventh signal sequence based on the interpolation parameter, to obtain the eighth signal sequence.

Preferably, the de-interpolation unit 2304 is specifically configured to: perform an inverse discrete Fourier transform IDFT on the seventh signal sequence to obtain a tenth signal sequence; delete ZH 0s from the head of the tenth signal sequence, and delete ZT 0s from the tail of the tenth signal sequence, to obtain an eleventh signal sequence; and perform a discrete Fourier transform DFT on the eleventh signal sequence to obtain the eighth signal sequence, where the length of the eighth signal sequence equals a value obtained by subtracting ZH and ZT from the length of the seventh signal sequence.

Specifically, the de-interpolation unit 2304 may be further implemented through generalized de-interpolation. For details, refer to the description in FIG. 10 and FIG. 11. Details are not described herein.

Preferably, the de-interpolation unit 2304 is specifically configured to demodulate the sixth signal sequence to obtain at least one group of seventh signal sequences.

Preferably, the receiving unit 2301 is further configured to receive information related to the interpolation parameter. The information related to the interpolation parameter is used by a receiving apparatus to determine the interpolation parameter.

For a specific operation process of the communications device provided in this embodiment of the present disclosure, refer to the detailed description in FIG. 3 to FIG. 20. Details are not described herein.

Figure 24:
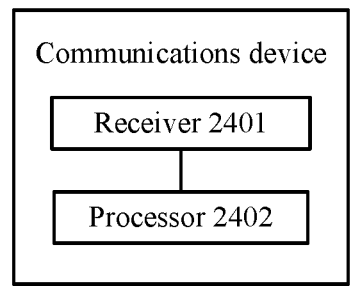
FIG. 24 is an architectural diagram of yet another communications device according to an embodiment of the present disclosure.

It should be noted that the communications device shown in FIG. 23 may be further implemented in the following implementation. Specifically, as shown in FIG. 24, the communications device includes a receiver 2401 and a processor 2402.

The receiver 2401 of the communications device is configured to receive a time-domain signal.

The processor 2402 is further configured to perform a fast Fourier transform FFT on the time-domain signal to obtain a sixth signal sequence that is on a subcarrier.

The processor 2402 is further configured to demodulate the sixth signal sequence to obtain a seventh signal sequence.

The processor 2402 is further configured to perform a de-interpolation operation on the seventh signal sequence to obtain an eighth signal sequence, where the eighth signal sequence includes soft information of a data symbol, and a length of the eighth signal sequence is less than a length of the seventh signal sequence.

The processor 2402 is further configured to decode the soft information of the data symbol to obtain the data symbol.

Preferably, the processor 2402 is further configured to obtain a pilot symbol; the processor 2402 is further configured to perform channel estimation based on the pilot symbol, to obtain channel-related information; and the processor 2402 is specifically configured to demodulate the sixth signal sequence based on the channel-related information, to obtain the seventh signal sequence.

Preferably, the processor 2402 is further configured to determine an interpolation parameter; and the processor 2402 is specifically configured to perform the de-interpolation operation on the seventh signal sequence based on the interpolation parameter, to obtain the eighth signal sequence.

Preferably, the processor 2402 is specifically configured to: perform an inverse discrete Fourier transform IDFT on the seventh signal sequence to obtain a tenth signal sequence; delete ZH 0s from the head of the tenth signal sequence, and delete ZT 0s from the tail of the tenth signal sequence, to obtain an eleventh signal sequence; and perform a discrete Fourier transform DFT on the eleventh signal sequence to obtain the eighth signal sequence, where the length of the eighth signal sequence equals a value obtained by subtracting ZH and ZT from the length of the seventh signal sequence.

Specifically, the processor 2402 may be further implemented through generalized de-interpolation. For details, refer to the description in FIG. 10 and FIG. 11. Details are not described herein.

Preferably, the processor 2402 is specifically configured to demodulate the sixth signal sequence to obtain at least one group of seventh signal sequences.

Preferably, the receiver 2401 is further configured to receive information related to the interpolation parameter. The information related to the interpolation parameter is used by a receiving apparatus to determine the interpolation parameter.

For a specific operation process of the communications device provided in this embodiment of the present disclosure, refer to the detailed description in FIG. 3 to FIG. 20. Details are not described herein.

A person skilled in the art should be aware that in the foregoing one or more examples, functions described in the embodiments of the present disclosure may be implemented by hardware, software, firmware, or any combination thereof. When the embodiment of the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the embodiments of the present disclosure are further described in detail in the foregoing specific implementations. It should be understood that the foregoing descriptions are merely specific implementations of the embodiments of the present disclosure, but are not intended to limit the protection scope of the present application. Any modification, equivalent replacement, or improvement made based on the technical solutions of the present application shall fall within the protection scope of the present application.

What is claimed is:

1. A method, comprising:
   obtaining a maximum delay deviation of a signal of a terminal device, wherein the signal of the terminal device is a wireless signal sent to the terminal device or a wireless signal sent by the terminal device, and the maximum delay deviation is a difference between an earliest time and a latest time at which the signal of the terminal device arrives at a receiving apparatus through a wireless channel after the signal of the terminal device is sent from a transmit end;
   determining an interpolation parameter based on the maximum delay deviation of the signal of the terminal device;
   performing an interpolation operation on a first signal sequence based on the interpolation parameter to obtain a second signal sequence, wherein a length of the second signal sequence is greater than a length of the first signal sequence;
   mapping the second signal sequence onto a subcarrier to obtain a mapped second signal sequence;
   performing an inverse fast Fourier transform (IFFT) on the mapped second signal sequence to obtain a time-domain signal; and
   transmitting the time-domain signal.

2. The method according to claim 1, further comprising:
   sending information related to the interpolation parameter, wherein the information related to the interpolation parameter is used to determine the interpolation parameter.

3. The method according to claim 1, wherein performing the interpolation operation comprises:
   performing an inverse discrete Fourier transform (IDFT) on the first signal sequence to obtain a third signal sequence;
   adding ZH zeros (0s) to a head of the third signal sequence, and adding ZT zeros (0s) to a tail of the third signal sequence, to obtain a fourth signal sequence, wherein both ZH and ZT are integers greater than zero; and
   performing a discrete Fourier transform (DFT) on the fourth signal sequence to obtain the second signal sequence, wherein the length of the second signal sequence is equal to a sum of the length of the first signal sequence, ZH, and ZT.

4. The method according to claim 3, wherein the first signal sequence comprises at least one data symbol.

5. The method according to claim 3, wherein the first signal sequence comprises at least one first pilot symbol obtained by performing a phase rotation on a second pilot symbol, and the second pilot symbol is used for performing at least one of channel measurement or channel estimation.

6. The method according to claim 5, wherein:
   the method further comprises determining an interpolation parameter;
   the first signal sequence further comprises at least one data symbol, wherein the at least one first pilot symbol and the at least one data symbol constitute the first signal sequence according to a first predefined rule; and
   the first predefined rule comprises: in the first signal sequence, at intervals of a first predefined quantity of data symbols, there is a candidate first pilot symbol location, and at least one candidate first pilot symbol location is selected to interpolate the first pilot symbol, wherein the first predefined quantity is determined based on the interpolation parameter.

7. The method according to claim 1, wherein mapping the second signal sequence onto the subcarrier to obtain the mapped second signal sequence comprises:
   mapping at least one group of second signal sequences onto the subcarrier to obtain at least one group of mapped second signal sequences.

8. A method, comprising:
   receiving a time-domain signal;
   performing a fast Fourier transform (FFT) on the time-domain signal to obtain a first signal sequence that is mapped on a subcarrier;
   demodulating the first signal sequence to obtain a second signal sequence;
   performing a de-interpolation operation on the second signal sequence to obtain a third signal sequence comprising soft information of a data symbol, and wherein a length of the third signal sequence is less than a length of the second signal sequence comprising:
      performing an inverse discrete Fourier transform (IDFT) on the second signal sequence to obtain a fourth signal sequence;
      deleting ZH zeros (0s) from a head of the fourth signal sequence, and deleting ZT zeros (0s) from a tail of the fourth signal sequence, to obtain a fifth signal sequence; and
      performing a discrete Fourier transform (DFT) on the fifth signal sequence to obtain the third signal sequence, wherein the length of the third signal sequence is equal to a value obtained by subtracting ZH and ZT from the length of the second signal sequence; and
   decoding the soft information of the data symbol to obtain the data symbol.

9. The method according to claim 8, wherein:
   before demodulating the first signal sequence, the method further comprises:
      obtaining a pilot symbol, and
      performing channel estimation based on the pilot symbol to obtain channel-related information; and
   demodulating the first signal sequence to obtain the second signal sequence comprises:
      demodulating the first signal sequence based on the channel-related information to obtain the second signal sequence.

10. The method according to claim 8, wherein:
    before performing the de-interpolation operation on the second signal sequence, the method further comprises:
       determining an interpolation parameter; and
    performing the de-interpolation operation on the second signal sequence to obtain the third signal sequence comprises:
       performing the de-interpolation operation on the second signal sequence based on the interpolation parameter to obtain the third signal sequence.

11. The method according to claim 10, further comprising:
receiving information related to the interpolation parameter, wherein the information related to the interpolation parameter is used to determine the interpolation parameter.

12. The method according to claim 8, wherein demodulating the first signal sequence to obtain the second signal sequence comprises:
demodulating the first signal sequence to obtain at least one group of second signal sequences.

13. An apparatus, comprising:
a processor; and
a non-transitory memory coupled to the processor for storing program instructions which, when executed by the processor, cause the apparatus to:
obtaining a maximum delay deviation of a signal of a terminal device, wherein the signal of the terminal device is a wireless signal sent to the terminal device or a wireless signal sent by the terminal device, and the maximum delay deviation is a difference between an earliest time and a latest time at which the signal of the terminal device arrives at a receiving apparatus through a wireless channel after the signal of the terminal device is sent from a transmit end;
determining an interpolation parameter based on the maximum delay deviation of the signal of the terminal device;
performing an interpolation operation on a first signal sequence based on the interpolation parameter to obtain a second signal sequence, wherein a length of the second signal sequence is greater than a length of the first signal sequence;
map the second signal sequence onto a subcarrier to obtain a mapped second signal sequence;
perform an inverse fast Fourier transform (IFFT) on the mapped second signal sequence to obtain a time-domain signal; and
transmit the time-domain signal.

14. The apparatus according to claim 13, wherein the program instructions, when executed by the processor, further cause the apparatus to:
determine an interpolation parameter, and
wherein the program instructions for performing the interpolation operation on the first signal sequence to obtain the second signal sequence comprise program instructions for:
performing the interpolation operation on the first signal sequence based on the interpolation parameter to obtain the second signal sequence.

15. The apparatus according to claim 6, wherein the program instructions, when executed by the processor, further cause the apparatus to:
perform an inverse discrete Fourier transform (IDFT) on the first signal sequence to obtain a third signal sequence;
add ZH zeros (0s) to a head of the third signal sequence, and add ZT zeros (0s) to a tail of the third signal sequence, to obtain a fourth signal sequence, wherein both ZH and ZT are integers greater than 0; and
perform a discrete Fourier transform (DFT) on the fourth signal sequence to obtain the second signal sequence, wherein the length of the second signal sequence is equal to a sum of the length of the first signal sequence, ZH, and ZT.

16. The apparatus according to claim 15, wherein the first signal sequence comprises at least one data symbol.

17. The apparatus according to claim 15, wherein the first signal sequence comprises at least one first pilot symbol obtained by performing a phase rotation on a second pilot symbol, and the second pilot symbol is used for performing at least one of channel measurement or channel estimation.

18. The apparatus according to claim 17, wherein:
the method further comprises determining an interpolation parameter;
the first signal sequence further comprises at least one data symbol, wherein the at least one first pilot symbol and the at least one data symbol constitute the first signal sequence according to a first predefined rule; and
the first predefined rule comprises: in the first signal sequence, at intervals of a first predefined quantity of data symbols, there is a candidate first pilot symbol location, and at least one candidate first pilot symbol location is selected to interpolate the first pilot symbol, wherein the first predefined quantity is determined based on the interpolation parameter.

19. The apparatus according to claim 13, wherein mapping the second signal sequence onto the subcarrier to obtain the mapped second signal sequence comprises:
mapping at least one group of second signal sequences onto the subcarrier to obtain at least one group of mapped second signal sequences.

* * * * *